United States Patent
Seligman et al.

(10) Patent No.: US 9,552,354 B1
(45) Date of Patent: *Jan. 24, 2017

(54) METHOD AND APPARATUS FOR CROSS-LINGUAL COMMUNICATION

(71) Applicant: Spoken Translation Inc., Berkeley, CA (US)

(72) Inventors: Mark Seligman, Berkeley, CA (US); Mike Dillinger, Berkeley, CA (US)

(73) Assignee: Spoken Traslation Inc., Berkeley, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/797,628

(22) Filed: Mar. 12, 2013

Related U.S. Application Data

(60) Continuation-in-part of application No. 13/567,216, filed on Aug. 6, 2012, now Pat. No. 8,731,944, which is a division of application No. 12/424,388, filed on Apr. 15, 2009, now Pat. No. 8,239,207, which is a division of application No. 10/936,093, filed on Sep. 7, 2004, now Pat. No. 7,539,619.

(60) Provisional application No. 60/535,218, filed on Jan. 9, 2004, provisional application No. 60/512,599, filed on Oct. 16, 2003, provisional application No. 60/500,720, filed on Sep. 5, 2003.

(51) Int. Cl.
*G06F 17/30* (2006.01)
*G06F 17/28* (2006.01)

(52) U.S. Cl.
CPC .................. *G06F 17/28* (2013.01)

(58) Field of Classification Search
CPC ....................................... G06F 17/28
USPC ....................................... 704/2, 3
See application file for complete search history.

(56) References Cited

U.S. PATENT DOCUMENTS

| 6,078,878 A | 6/2000 | Dolan |
| 6,287,125 B1 | 9/2001 | Dorcely |

(Continued)

OTHER PUBLICATIONS

Regarding related patents and patent applications, see the section of the accompanying IDS letter entitled "Related Patents and Patent Applications" for further information.

*Primary Examiner* — Qian Yang
(74) *Attorney, Agent, or Firm* — Womble Carlyle Sandridge & Rice LLP

(57) ABSTRACT

A system and method for a highly interactive style of speech-to-speech translation is provided. The interactive procedures enable a user to recognize, and if necessary correct, errors in both speech recognition and translation, thus providing robust translation output than would otherwise be possible. The interactive techniques for monitoring and correcting word ambiguity errors during automatic translation, search, or other natural language processing tasks depend upon the correlation of Meaning Cues and their alignment with, or mapping into, the word senses of third party lexical resources, such as those of a machine translation or search lexicon. This correlation and mapping can be carried out through the creation and use of a database of Meaning Cues, i.e., SELECT. Embodiments described above permit the intelligent building and application of this database, which can be viewed as an interlingua, or language-neutral set of meaning symbols, applicable for many purposes. Innovative techniques for interactive correction of server-based speech recognition are also described.

7 Claims, 16 Drawing Sheets

(56) References Cited

U.S. PATENT DOCUMENTS

| | | |
|---|---|---|
| 6,385,568 B1 | 5/2002 | Brandon et al. |
| 6,442,522 B1 | 8/2002 | Carberry et al. |
| 6,446,035 B1 | 9/2002 | Grefenstette et al. |
| 6,604,101 B1 * | 8/2003 | Chan et al. ............. 707/706 |
| 6,996,520 B2 | 2/2006 | Levin |
| 6,996,800 B2 | 2/2006 | Lucassen et al. |
| 7,028,306 B2 | 4/2006 | Boloker et al. |
| 7,184,948 B2 | 2/2007 | Chalabi |
| 7,286,651 B1 | 10/2007 | Packingham et al. |
| 7,328,158 B1 * | 2/2008 | Burridge et al. ............. 704/270 |
| 7,392,185 B2 | 6/2008 | Bennett |
| 7,539,619 B1 | 5/2009 | Seligman et al. |
| 8,239,207 B2 | 8/2012 | Seligman et al. |
| 8,280,721 B2 | 10/2012 | Snow et al. |
| 2002/0069048 A1 * | 6/2002 | Sadhwani et al. ............. 704/3 |
| 2003/0139920 A1 * | 7/2003 | Abir ............................. 704/2 |
| 2003/0236658 A1 * | 12/2003 | Yam ............................. 704/2 |

\* cited by examiner nslation Shortcuts   Text-to-Speech   Help

☐ INPUT: Edit and Re-Translate if necessary this is a cool program

☒ BACK-TRANSLATION: Is this what you meant?

*Pronounce Back-Translation*

☐ MEANING CUES: Double-click on a word to change its meaning

IS (VERB): be
A (ARTICLE): an
COOL (ADJECTIVE): cold, fresh, chilly, chill, stony, nippy
PROGRAM (NOUN): computer programme, computer program, application program, small app programme, applet

☒ TRANSLATION

éste es un programa frío

*Pronounce Translation*

Fig. 7

METHOD AND APPARATUS FOR CROSS-LINGUAL COMMUNICATION

PRIORITY CLAIM AND CROSS REFERENCES TO RELATED APPLICATIONS

This application is a continuation in part of U.S. application Ser. No. 13/567,216, filed Aug. 6, 2012, which is a divisional application of U.S. patent application Ser. No. 12/424,388 filed on Apr. 15, 2009, now U.S. Pat. No. 8,239,207 issued Aug. 7, 2012, which is a divisional application of U.S. patent application Ser. No. 10/936,093, filed Sep. 7, 200 now U.S. Pat. No. 7,539,619 issued May 26, 2009. This application also claims benefit under 35 U.S.C. §119(e) of U.S. Provisional Patent Application No. 60/500,720 filed Sep. 5, 2003 and entitled "METHOD AND APPARATUS FOR SPEECH-TO-SPEECH AND TEXT-TO-TEXT MACHINE TRANSLATION FOR CROSS-LIGUISTIC COMMUNICATION," U.S. Provisional Patent Application No. 60/512,599 filed Oct. 16, 2003 and entitled "METHOD AND APPARATUS FOR SPEECH-TO-SPEECH AND TEXT-TO-TEXT MACHINE TRANSLATION FOR CROSS-LIGUISTIC COMMUNICATION," and U.S. Provisional Patent Application No. 60/535,218 filed Jan. 9, 2004 and entitled "USES OF STI TECHNOLOGY." Each of these applications is herein incorporated by reference in its entirety for all purposes.

BACKGROUND OF THE INVENTION

This invention relates generally to translation systems and more particularly real-time cross-lingual communication methods and systems.

Language differences constitute barriers that block communication everywhere. In enterprises, language is a barrier to contacts with foreign-speaking customers, partners, distributors, sales reps, employees, colleagues, research collaborators, foreign government counterparts, etc. In hospitals, it is a barrier between foreign-speaking patients and doctors. In the military, the language barrier impedes sharing updated information moment-to-moment among members of a multinational force. In the personal world, it is a barrier to communicating with overseas relatives, service providers, etc.

Human interpreters provide way of addressing language differences in live meetings and phone calls. However, such specialists are difficult to schedule and prohibitively expensive for spontaneous and/or informal communications. Similarly, human translators for written communications are very expensive, and may introduce unacceptably long delays. Currently available machine translation tools are unreliable, and the benefits of real-time communication and direct human contact are often lost. Furthermore, when currently available, relatively fragile translation tools are combined with similarly imperfect automatic speech recognition systems, errors are compounded in each step of processing, to the point where the result is often unintelligible. Such speech-to-speech machine translation systems permit little or no user intervention in the speech recognition or translation processes, beyond rewriting the input sentence. Thus the user has no control over how the system recognizes or translates a given spoken sentence, and the errors that result undermine the user's confidence in computer-mediated communication.

One particular obstacle for machine translation quality is the problem of word-sense disambiguation, i.e., of correctly identifying the sense in which a given word was intended in the input sentence. Existing automatic techniques have proven insufficient for disambiguation because 1) many sentences in common usage are elliptical or ambiguous and 2) semantically rich dictionary information that is necessary for accurate translation is available only in limited quantities, from diverse sources, and in diverse implementations.

Further exacerbating the problem is the fact that machine translation systems for different languages are developed by different providers, with diverse and often incompatible interfaces and implementations, making installation, maintenance, and use infeasible. The upshot is that no convenient, cost-effective solution currently exists for bridging the language gap, especially for impromptu or informal communication situations.

As a result, there is a need to solve the problems of the prior art to providing accurate and real-time machine translation.

SUMMARY OF THE INVENTION

Broadly speaking, the present invention fills these needs by providing a method and system enabling real-time speech and text translation. It should be appreciated that the present invention can be implemented in numerous ways, including as a method, a system, computer-readable media or a device. Several inventive embodiments and components of the present invention are described below.

In one embodiment, a method for mapping word senses across lexical resources is provided. The method begins by selecting a target term from a first lexical resource. Then, possible matches to the target term are identified from a second lexical resource. The method includes calculation of a semantic distance between possible matches to the target term and the target term. The possible matches to the target term are then ranked according to relevance. Then the target term from the first lexical resource is associated with one of the possible matches having the lowest semantic distance from the target term.

In another embodiment, a computer-readable medium having program instructions for mapping word senses across lexical resources is provided. The computer-readable medium includes program instructions for selecting a target term from a first lexical resource and program instructions for identifying possible matches to the target term from a second lexical resource. Program instructions for ranking the possible matches to the target term according to relevance and program instructions for calculating a semantic distance between possible matches to the target term and the target term are included. Program instructions for associating the target term from the first lexical resource with one of the possible matches having the lowest semantic distance from the target term are provided.

In yet another embodiment, a system providing cross-lingual communication is provided. The system includes a client component configured to capture speech and tactile inputs. The client component provides a user interface configured to display meanings for an input term. A translation of the input term into a different language than the input language and a back-translation or paraphrase of the translation are also displayed on the user interface. The system includes a server component configured to provide the meanings, the translation, and the back-translation to the client component based upon the input term. The server component includes an interaction manager configured to request the translation of the input term. The interaction manager is further configured to access Meaning Cues corresponding to the input term for presentation through the client component.

In still another embodiment, a cross-lingual communication system is once again provided. The system includes a multi-modal user interface. The system further includes an interaction manager in communication with the multi-modal user interface. The interaction manager has logic for providing semantic cross-indexing between a translation engine and a database of meaning information. The translation engine provides a translation for a term delivered by the interaction manager. The database of meaning information includes corresponding meaning information for the term delivered by the interaction manager.

In another embodiment, a graphical user interface (GUI) enabling computer-mediated communication is provided. The GUI includes a first region for displaying input terms in a first language. The GUI includes a second region for displaying Meaning Cues for each of the input terms. A third region of the GUI is provided for displaying a translation of the input terms in a second language. A fourth region of the GUI is included for displaying a back-translation in the first language. The back-translation is based upon the translation.

In yet another embodiment, a method enabling cross-lingual communication through speech and text machine translation is provided. The method starts by receiving a first and a second language selection. Then an expression in the first language is received. The expression in the first language is presented for verification. Then the verified expression is translated into an expression in the second language. The method includes confirming the meaning of terms within the verified expression in the first language and back-translating the expression in the second language to a back-translated expression in the first language. The back-translated expression in the first language is then verified.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood through examination of the following detailed description in conjunction with the accompanying drawings, in which like reference numerals designate like structural elements.

FIG. 7 illustrates one implementation of an end-user interface for verification of the current translation, focusing upon the claimed facilities for back-translation (branded as Reliable Retranslation™) and lexical disambiguation (branded as Meaning Cues™).

DETAILED DESCRIPTION OF THE PREFERRED EMBODIMENTS

Figure 1:
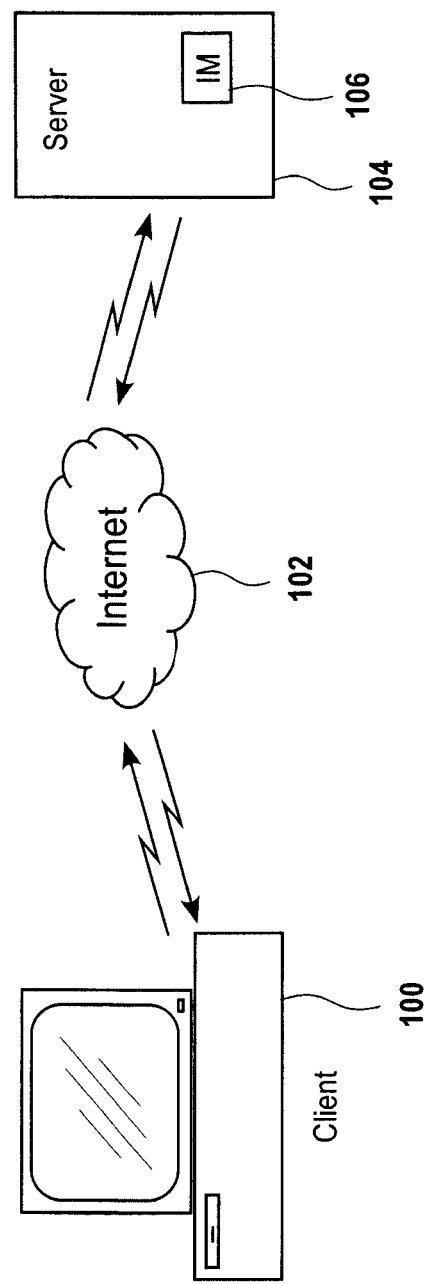
FIG. 1 is a high level simplified schematic diagram of a system configured to provide cross-lingual communication in accordance with one embodiment of the invention.

An invention is described which permits for the first time a highly interactive style of automatic speech-to-speech translation. The interactive procedures enable a user to recognize, and if necessary correct, errors in both speech recognition and translation, thus providing much more robust translation output than would otherwise be possible. Because of this enhanced robustness, automatic speech-to-speech translation can for the first time be practically extended to wide-ranging language structures and topics, beyond the boundaries of narrow domains such as hotel or airline reservations, without sacrificing accuracy to the point of impracticality. The techniques for interactive translation crucially include facilities for monitoring and correcting word ambiguity errors. To effectively choose word meanings in context, users require Meaning Cues (definitions, synonyms, examples, associated words, pictures, etc.). Such cues must be collected from disparate sources and correlated by word sense, and then aligned with, or mapped into, the word senses of third party lexical resources, such as those of a machine translation or search lexicon. This correlation and mapping can be carried out through the creation and use of a database of Meaning Cues, here called SELECT. Embodiments to be described permit the intelligent building and application of this database, which can be viewed as an interlingua, or language-neutral set of meaning symbols, applicable for many natural language processing tasks, including search and language instruction. As for interactive speech recognition techniques: immediate voice-driven or manual correction of dictation (very large vocabulary speech recognition) is also crucial to the operation of a practical speech-to-speech translation system at the state of the art. Innovative techniques to be described here permit such interactive correction even when a speech recognition engine is running on a remote server. It will be obvious, however, to one skilled in the art, that the present invention may be practiced without some or all of these specific details. In other instances, well known process operations have not been described in detail in order not to unnecessarily obscure the present invention.

The embodiments described herein are designed to make machine translation (MT) and speech recognition (SR) practical for cross-lingual communication, especially with respect to real-time or short-term exchanges, whether in person or via instant messaging, chat, and email. While the embodiments described below may incorporate spoken input through speech recognition software, the input may instead be typed, entered through a stylus, or entered through some other suitable non-speech input technique.

Described below are techniques for interactive monitoring and correction of (1) word meaning errors in translation and (2) speech recognition errors (even when the recognition engine is running on a server).

Interactive Correction of Word Meaning Errors During Translation.

For MT, the ability to verify or correct the meanings of words and expressions during translation enhances the subsequent translation quality. For example, in the sentence: "The old man sat on the bank," the word "bank" is likely intended to mean "river bank." However, the MT engine may wrongly assume that "savings bank" or "piggy bank" was meant instead, and may mistranslate accordingly. The embodiments described below enable users the ability to check for, and head off, such errors before translation is completed. Thus the errors are corrected before they can cause confusion or embarrassment.

As mentioned, to select appropriate meanings, users need effective Meaning Cues in their own language. The Meaning Cues provide definitions, examples, synonyms, associated words, pictures, etc., that help users to resolve ambiguous meanings. For example, in the present case, "bank" should have, or if necessary should be assigned, the meaning corresponding to the definition and example "The rising ground along a river or lake," e.g., "We went fishing along the river's bank". However, it is not at all trivial to assemble understandable Meaning Cues for a given MT engine and input language, since cues must be gathered from various sources (online dictionaries, thesauri, etc.) and each MT engine handles word senses differently. Further, even once usable Meaning Cues have been assembled, they must be presented understandably and ergonomically.

It should be appreciated that the "Meaning Cues," a set of definitions, examples, synonyms, associated words, pictures, etc., are used to facilitate word sense selection. As described in more detail below, the algorithms and data structures, especially a central structure referred to as the SELECT database, are used to assemble Meaning Cues from available resources and to align them with the word senses of a particular MT engine used for translation. An interface effectively presents Meaning Cues to a user in order to enable verification or selection of a word sense in context prior to translation. In one embodiment, the entire system supports gradual learning of the user's preferred word senses with continued use, so that less interaction is required as time goes on, i.e., the system is capable of storing the user's preferences.

Interactive Correction of Speech Recognition Errors, Even when the Recognition Engine Runs on a Server.

Dictation, or speech recognition with truly broad coverage, can be distinguished from other current speech recognition (SR) technology in several respects. Dictation requires the creation and maintenance of individual voice profiles, also called acoustic models, for each user. In other words, a speaker-dependent variety of speech recognition is assumed herein. Currently, most dictation is still executed at the client, or local computer. Such local processing avoids problems related to audio transmission, voice profile maintenance, and scaling. Local processing may also simplify the creation of facilities for immediate visual feedback concerning recognized words. However, local processing imposes the limitation that users are tied to one particular computer. That is, the user can dictate from nowhere else, since the speech recognition application and the individual voice profile remain loaded only at the client.

Services that let users dictate from anywhere by telephone lack the feedback and correction facilities described herein. As a result, users cannot see the resulting text, and correction is possible only in a post-processing phase after speech recognition for the entire dictation session is finished. Furthermore, unlike the speech recognition itself, this post-processing must be carried out using a client-based, as opposed to server-based, program. The embodiments described herein enable full graphic feedback and voice-driven or typed correction for server-based dictation. That is, the feedback and correction facilities have been extended to the online or server-based dictation world through the embodiments described herein, which include, among other things, techniques for audio transmission, voice profile maintenance, and scaling related to server-based feedback and correction of dictation.

System for Highly-Interactive Automatic Speech-to-Speech Translation.

In addition, techniques for concatenating interactive dictation and interactive machine translation to yield practical speech translation systems are described in more detail below. In one embodiment, speech recognition is separated from machine translation, and interactive correction is provided for both stages. As mentioned, these techniques allow speech-to-speech translation systems to reach unprecedented levels of output quality, even while permitting unprecedented linguistic and topical coverage, i.e., freedom to choose vocabulary and linguistic structures, and to move from topic to topic.

FIG. 1 is a high-level simplified schematic diagram of a system configured to provide cross-lingual communication in accordance with one embodiment of the invention. Client 100 communicates with server 104 through a distributed network such as the Internet 102. It should be appreciated that the communication between client 100 and server 104 may be performed through either a wired connection or a wireless connection. Server 104 includes interaction manager (IM) module 106. Interaction manager module 106 is configured to accept speech and text input from client 100, as well as user choices or preferences. In addition, interaction manager 106 is configured to provide transcription, user options, translation, and back-translation output to client 100. Further details of the inputs and the outputs to and from interaction manager 106 are provided with reference to FIG. 2.

As explained further below, the cross-lingual system of FIG. 1 is configured to enable a user to dictate text in one language, e.g., English; correct any dictation errors; send the corrected text for translation into another language, e.g., Spanish, German, Japanese, etc.; correct any translation errors stemming from word ambiguities; send the corrected translation to a selected application; and hear the corrected translation. The embodiments described herein have many practical applications. For example, a patient and a doctor may communicate through the use of the system described herein in order to communicate when the patient and the doctor do not speak the same language. Other exemplary applications include academic applications such as the learning of a foreign language. In addition, people traveling to a foreign country may also use the cross-lingual system described herein. The client component may be a portable device such as a laptop computer. Alternatively, the client component may be a handheld device such as a personal digital assistant, cell phone, pocket personal computer, etc. In another embodiment, customer service organizations may offer multiple languages for service conversations with a monolingual service representative. One skilled in the art will appreciate that other suitable applications exist where real time translation is needed and the above-described applications are not meant to be limiting.

Figure 2:
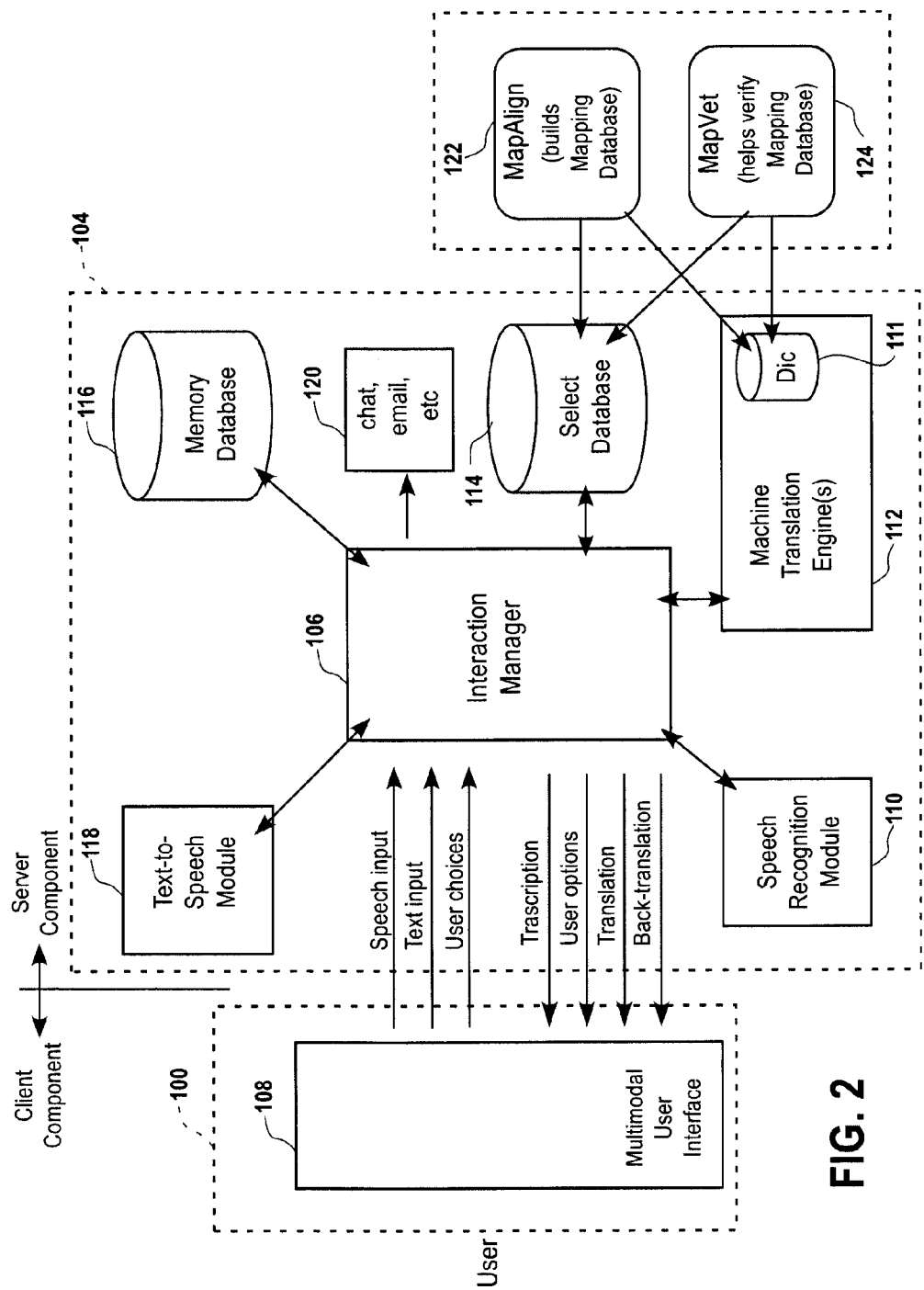
FIG. 2 is a more detailed diagram of the components of the cross-lingual system in accordance with one embodiment of the invention.

FIG. 2 is a more detailed diagram of the components of the cross-lingual system in accordance with one embodiment of the invention. The system includes a client component and a server component. The client component includes multi-modal user interface 108 incorporated into client 100. Multi-modal user interface 108 is configured to enable a user to determine how a translation program has interpreted a current utterance from the user. As will be illustrated with reference to FIGS. 4A-4G, multi-modal user interface 108 indicates the meaning to the user through a back-translation or paraphrase and through a set of Meaning Cues showing the significance of each word or term in the utterance. It should be appreciated that the user needs a clear indication of how the computer has interpreted his/her utterance. This interpretation is clarified using indicators of the meaning of each word or term, the translation of the utterance, and the back-translation or paraphrase of the translation. Alternate senses and translations of words or terms are also made available in the form of different Meaning Cues accessed from SELECT database 114. Thus users have all the information that is needed to select the word senses they want to use. The information displayed relates to the conceptual meanings of words or terms in context. Accordingly, multi-modal interface 108 is focused on knowledge of word senses, rather than on grammatical details or other technicalities that users find difficult to understand. Input from a user to multi-modal user interface 108 may be in the form of speech or text. In the case of speech input, speech recognition module 110 on the server component will translate each input into digital versions of letters. That is, speech recognition module 110 recognizes speech signals and presents to interaction manager 106 a digital signal in ASCI or unicode format. The information about word senses is displayed as a uniform set of Meaning Cue types, such as synonyms, category names, example sentences, dictionary definitions, common collocates, or pictures, according to the user's preference.

Interaction manager module 106 then outputs the transcription of the spoken phrase for display on multi-modal user interface 108. At this point, a user is able to immediately correct or change the transcription, even though speech recognition may be operating at a server. Any user selections or choices are communicated from client 100 to IM 106 in order to verify the transcription. Once the transcription has been verified, a user may initiate its translation through multi-modal user interface 108, which in turn transmits the captured instruction to IM 106. Machine translation engine 112 is in communication with IM 106 and provides meanings corresponding to each term of an utterance to be translated. In one embodiment, machine translation engine 112 provides a list of options for translation of a certain term. Machine translation engine 112 includes dictionary database 111. Dictionary database 111 stores meanings associated with the particular term being translated, but generally in machine-readable form only. Once the translated term is retrieved, IM 106 accesses SELECT database 114 in order to obtain human-readable Meaning Cues for the term being translated. As will be discussed further below, the Meaning Cues are one or more descriptions for each sense of a term that is being translated.

Server component of FIG. 2 includes server 104 and memory database 116 that is in communication with IM 106. Memory database 116 is configured to contain "favorites" of a user that represent frequently used choices of word and phrase meanings. In another embodiment, memory database 116 stores user profiles which may include speech profiles for a specific user along with word sense preferences. Thus, once a profile is established for a particular user, those preferences are maintained for each user session, and across sessions, as well. Server component 104 includes text-to-speech module 118. Text-to-speech module 118 is configured to take the ASCII, or Unicode format, and generate speech representing the text version of the translation so that a user can hear its pronunciation. Additionally, IM 106 may be configured to output translated text for instant messaging applications, chat, email, etc., as represented in module 120.

SELECT database 114 of FIG. 2 contains Meaning Cues which represent word sense information. In one embodiment, definitions, synonyms, etc., for each word sense are provided. It should be appreciated that SELECT, which is an acronym for Sense-Indexed Enriched Lexicon Enabling Cuing for Translation, provides the user with characterizations of all relevant word senses and provides the machine translation systems with more precise input information. Crucially, this semantically rich information concerning word senses, which is now available only in fragmentary, disparate forms, may now be unified through SELECT database 114. Each entry in SELECT database 114 corresponds to a single word sense and typically includes several types of Meaning Cue (definitions, synonyms, example sentences, co-occurring words, etc.) for that sense, so that users can choose the types that they prefer to characterize alternative word senses. SELECT database 114 provides more varied, versatile, and powerful information than the dictionaries in current machine translation systems because it is organized by word senses rather than by words, and because the SELECT database can correlate and specify word senses for both humans and machines running natural language processing applications. Thus SELECT database 114 makes it possible for one system, i.e., a lexical resource such as a machine translation engine, to use resources available in another system. SELECT database 114 provides a cross-indexing scheme between Meaning Cues and machine translation engine 112. MapAlign module 122 and MapVet module 124 are used for building and mapping SELECT database 114 and for cross-indexing the SELECT database to machine translation engine 112. It should be appreciated that the details of implementation of SELECT database 114, MapAlign module 122, and MapVet module 124 may vary depending on the technology of machine translation engine 112.

Machine translation engine 112 of FIG. 2 may be a commercially available machine translation engine, such as those available from WORD MAGIC or LINGENIO. In another embodiment, machine translation engine 112 may be a proprietary machine translation engine. It should be appreciated that machine translation engine 112 may be of any technological type: it may be rule-based, statistical, hybrid, or other. Further, a plurality of machine translation engines may be used. Through SELECT database 114, common terms in each of the plurality of machine translation engines are cross-indexed.

A more detailed discussion of the SELECT database of Meaning Cues and the algorithms used to construct it and align it with third party lexical resources is provided below. For illustrative purposes, details will be given for both rule-based and statistical machine translation engine types.

The SELECT Database and Related Algorithms.

It should be appreciated that different lexical resources (like dictionaries, thesauri, collocation lists, etc.) provide various sorts of information about words and their senses. To make best use of lexical resources including machine translation engine dictionaries, robust methods are needed for aligning the information across resources, not by words, but by word senses. For example, the "financial institution" sense of "bank" in WEBSTER is associated with this sense's definition, etymology, pronunciation and example sentences, while the same sense in ROGET is instead associated with the correct superordinate and subordinate terms. In the SELECT database, all of this information is brought together under a uniquely identified word sense symbol. Similar alignment may be performed on resources in different languages so that the correct translation, definition, example sentences, etc., for the same concept in either language may be accessed. If the same scheme is extended to multiple languages, SELECT can serve as an interlingua, or language-neutral set of meaning symbols usable for many natural language processing tasks.

Unfortunately, each lexical resource uses a different categorization scheme (or "ontology") to organize word senses or meanings. It is simply not possible to map directly from one scheme to the next because the category names and the ways of dividing and grouping word senses are different. If the categorization scheme is seen as an acyclic graph or "tree," both the topology and the node labels are different from ontology to ontology, even if the same concepts are present as the "leaves" of the tree.

Solutions to this resource-alignment or ontology-mapping problem are often based on the observation that, even if the trees or classification schemes are different, in all of them the classes are defined as groups of terms (or "leaves"), often represented as synonym lists or "synsets." These groupings or classes correspond to concepts, and the term lists which compose them constitute vectors of attributes. Thus concepts from distinct systems can be compared, since the more terms two concepts have in common, the more similar they can be considered. The term list within a concept can thus be taken to represent its "profile." In the most general terms, then, the algorithm proposed here for intermapping or correlating two ontologies or sets of word sense classes proceeds as follows: it takes as input two Profiles, each a list of synonyms or other terms corresponding to a particular word sense in one of the ontologies, and computes how "close" or "associated" the two Profiles are, i.e., computes their semantic distance. Given a list of candidate word-sense Profiles which might be judged equivalent to the current input word sense, the algorithm chooses the best (most overlapping and thus most similar) one.

The available information about a term (word or expression) to be handled by the word-sense mapping algorithm varies widely. In the general case, only the term (the word or expression itself) is used as input to the algorithm, and information about its senses is retrieved from the current resource, e.g. the translation lexicon of a machine translation vendor like Word Magic. For each resource, at least some information concerning the current term (word) is generally available, e.g., a definition, translations, synonyms and/or related words, etc. In one embodiment, when there are multiple senses for the target term in the current resource, they are processed (mapped to the senses of another ontology, e.g. SELECT) one by one. For processing of one such word sense to proceed, some Profile of synonyms and/or related words must be constructed. As explained, this Profile is a vector of terms which can serve as indicators of the word sense in question. Profile generation can be carried out in various ways, and is a significant step in the intermapping of ontologies by word sense, because the Profiles are the principal indicators of the word senses involved.

For each sense in the SELECT database, several pieces of information may be available, e.g., a list of synonyms, a definition, lists of superordinate and subordinate terms, example sentences, a unique identifier, or links to equivalent concepts in other resources (e.g., ROGET, WEBSTER, WORDMAGIC, LINGENIO, etc). Of particular interest for mapping is the list of synonyms, since this list constitutes the Profile for that SELECT sense. Additional information contained within the Profile may also include other related words, such as hyponyms, hypernyms, and neighboring semantic terms. As used herein, neighboring semantic terms refer to terms within a radius of a certain semantic distance of a target term. In one embodiment, the semantic distance is set within two links to be considered a neighboring semantic term. For example, a term that includes the target term (a hypernym) may be referred to as one link, a term that includes a term of the hypernym is a neighboring semantic term within two links, and so on. In one embodiment, this relationship is between the sibling nodes of a tree. Of course any number of links may be used, as two links is exemplary and not meant to be limiting. This information can be used in several ways when attempting to map a target term from the current ontology to the most similar word sense in the SELECT database. The first step is to generate candidate word senses in SELECT, which can then be tested for closeness to the word senses of the target term. These candidate word senses may be generated by the following techniques: by target term, by Profile, by definition, and/or by components of the target term. Each of these techniques is briefly described below.

When generating candidate word senses by target term, the candidates become all SELECT database word senses whose Profiles (synonym lists) contain the target term. These candidates are added to selectSenseList. If the target term is not in the Profile of any SELECT word sense (as may be the case), the algorithm continues to generate candidates by other means listed below.

By Profile:

If the incoming information for the current target term is associated with a Profile (a list of synonyms/related words), then, for each synonym etc. in that Profile, all SELECT word senses whose Profiles contain that synonym are fetched and added to selectSenseList. (For the WORDMAGIC machine translation engine, the terms in the Profile of each word sense have already been disambiguated and given the correct wordMagic_id, thereby making them quite reliable indicators.)

By Definition:

Candidates become all word senses from the SELECT database whose definition includes the target term. As usual, all candidates are added to selectSenseList. For example, when attempting to map a certain word sense of "bank", a SELECT word sense for "investment" might become a candidate if it contained the word "bank" in its definition.

By Components of the Target Term:

If a compound target term (an expression containing several words) was not found in SELECT, then all of the senses for each noun, verb, adjective or adverb in the target term expression are used to identify word sense candidates to be added to the selectSenseList. For example, when attempting to map the multi-word term "savings bank," the word "bank" would be used to retrieve a candidate word sense for "bank".

Once the SELECT candidates for the target term have been identified through these techniques, these candidates are ranked according to a weighted frequency. The idea here is that the SELECT word senses have been fetched most frequently as candidates by any of the above techniques are most likely to match the incoming target word sense. For instance, if a given SELECT candidates has been fetched as a candidate match for the target term, and also for its synonyms (when fetching by Profile), and also when fetching using the definition, then this particular word sense gains evidence as a plausible match. In one embodiment, different weights are assigned to each candidate word sense depending on the method of fetching it (its "source") and how "informative" it is. Each time a selectSense appears, a weight is associated to it. In one embodiment, the weight is assigned by the source and informativity of the candidate as follows: profile (15), definition (10), component term (10) and by informativity (1/number of SELECT senses found as candidates). Here the numbers shown in parentheses as relative weight factors are provided for exemplary purposes only.

Once the list of candidate SELECT word senses has been gathered, a filter may be applied to organize it. In one embodiment, candidates with a frequency below 2 and duplicates are first removed. The top three candidates are then extracted from the lists fetched using the target term and Profile techniques. Then the top three candidates from the other techniques (definition, and components of target term) are identified. These 6 best SELECT candidates are then returned as the final list of matching candidates. Finally, in order to select the best mapping for every word sense of the input term, the Profiles of all input word senses and those of all candidate SELECT word senses are compared pairwise, to check all possible correspondences. (It should be appreciated that the SELECT candidates are ranked as described in the previous paragraph only when there are several SELECT candidates available for the input word sense being processed, or when there are several input word senses.)

When constructing the SELECT database, a new "MapSet" is built which includes a sorted array of "MapObjects," one for each possible mapping between a resource word sense and a SELECT word sense. In building the MapSet, MapObjects are manipulated: they are tested for statistically significant differences between competing mappings, ordered, and sometimes discarded. As explained earlier, the score of an attempted match or mapping between a target word sense and a SELECT word sense depends on the degree of overlap between their respective Profiles. Various techniques can be used for evaluating the degree of overlap. In one embodiment, an Association value is computed for each possible mapping (map object). A Significance score can then be computed to compare possible mappings based upon their respective Association scores: Significance of the difference between the best two mappings is a function of the logarithm of the ratio Best Option Association/Second-Best Option Association.

A MapObject is an array of information about a possible mapping between a single resource sense and a single SELECT sense. The two key pieces of information produced in building a MapObject are the weighted Overlap (vector dot product) between the profiles of the two senses being compared, and the Association computed for that overlap. As input for the construction of a MapObject, we need information about the two senses being mapped, i.e., their respective Profiles (list of synonyms). When the same term appears in both profiles, the Overlap for the current MapObject is increased by 1*weight, where the weight can be computed in several ways, according to the input parameters. Weight can be a function of the current term's length (for instance, "savings bank" is longer than "bank", see below), or its "informativity" (see below), or both, or neither.

"Informativity" is a measure of the ambiguity of the matched term, i.e., its reliability as an indicator of a given sense. Informativity is simply 1 divided by the number of senses found for the term in SELECT. If "bank" has 10 senses, its informativity is 0.10; if it has only 2, its informativity is 0.5. When informativity is used to compute the weight of an overlap, the weight is 1+informativity.

Term length, in number of words, is interpreted as an indicator of specificity of meaning. "National Savings bank" and "savings bank" are less ambiguous than (have more precise meanings than) "bank". Thus if a longer, more precise term matches when two Profiles are compared, it is given more weight because it is a better indicator of a specific meaning. When length is used to compute the weight of an overlap, the weight is the length of the term matched. When using both length and informativity, the overlap is increased by length*(1+informativity) for each matched term.

Overlap is computed as a proportion of the size of the incoming profiles, to permit comparison across profiles of widely divergent sizes. In order to prevent the number of overlaps being hidden by the large size of a profile, a limit, e.g., 20 is imposed on the profile size, for the purposes of computing overlap.

Several measures of association (goodness of match or mapping between two word senses) have been implemented for use in the computeAssociation function. The specific measure and the size of relevant weights can be chosen as parameters for this function. In most general terms, all of these measures are defined in terms of the ratio of the size of the intersection of two sets to the size of their union. However, in one embodiment, one of the sets can be given greater importance by weighting it more heavily. If there is a match, the word is in both SELECT and in the resource, but the size of the profile is usually different, so that one match from a 20-item profile adds less to the distance score than one match from a 5-item profile. To compensate for this discrepancy, SELECT database terms are weighted (for example) three times more heavily than the resource to show that matches in the SELECT Profile are more important than matches in the resource profile. Of course, different weighting schemes may be applied to favor matches ion the SELECT Profile.

When all possible mappings between a target word sense and the SELECT database have been evaluated, it may occur that all of the candidate mappings are eliminated for lack of overlap, or for not meeting all threshold criteria. This situation is most often encountered when the target term simply is not found in SELECT. In this case, a new word sense representing the unmatched target word sense is added to SELECT. However, if there are several surviving mapping possibilities, and if the association computed for the first map option is significantly larger than that for the second map option (using a standard statistical procedure for assessing the significance of a difference, the t Test), then there is enough evidence to take the first mapping option as the correct one, and to record the successful mapping by adding the target word sense's identifier (its resource_id) to the SELECT word sense's record (its select_id). And finally, in some cases, the algorithm cannot (and often should not) decide between two surviving candidate SELECT senses as the closest to the target word sense, since the two SELECT senses are equally closely related. In this situation, all of the relevant word senses are displayed so that humans can select the best mapping.

Figure 3:
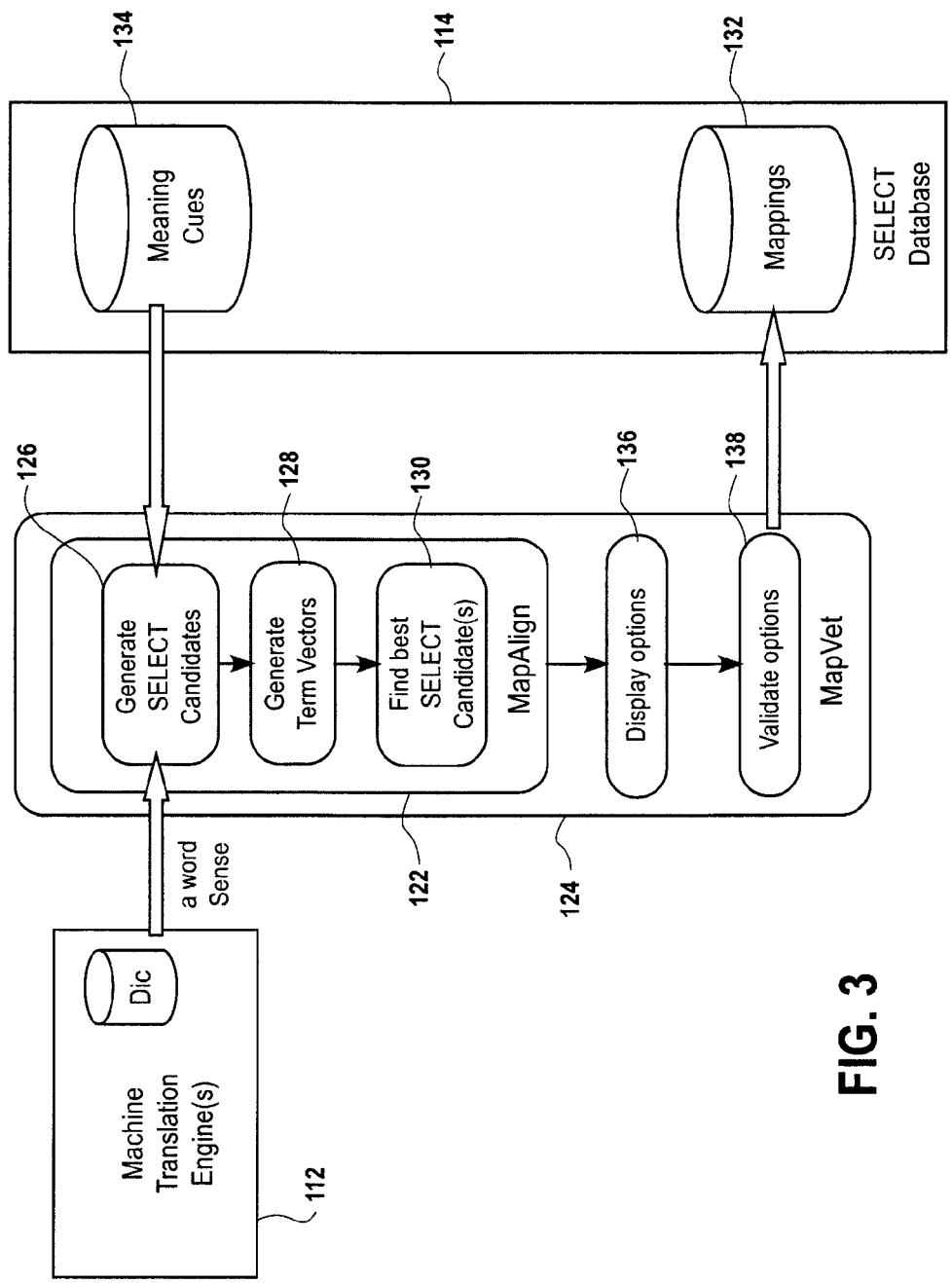
FIG. 3 is a more detailed description of the MapAlign and MapVet modules and their relationship in generating and cross-indexing terms in a lexical resource to terms in the SELECT database in accordance with one embodiment of the invention.

FIG. 3 is a more detailed description of the MapAlign and MapVet modules and their relationship in mapping terms from an outside resource to the SELECT database in accordance with one embodiment of the invention. The MapAlign and MapVet modules contain algorithms that map or align linguistic resources by word sense (MapAlign) and then verify that mapping (MapVet) to build the SELECT database. To appreciate the need for this alignment or mapping, note that ROGET'S THESAURUS identifies some 26 possible senses for "bank" but provides no definitions or example sentences. On the other hand, WEBSTER'S UNABRIDGED identifies 17 senses for "bank," with definitions and example sentences for some senses. It would be useful for many purposes to correlate the synonym information in ROGETS with the definitions etc. of WEBSTERS. More specifically, to offer different types of Meaning Cues to the user of the translation system described here, these resources must be aligned quickly and cost-effectively. However, there is no readily available technique to determine which ROGET senses go with which WEBSTER'S definitions. (Ontology mapping developed in the context of the Semantic Web is insufficient for our purposes, since it is adapted to the specific characteristics of aligning or cross-indexing semantically rich resources, such as thesauri and dictionaries.) The mapping procedure described here does meet both the general and specific needs, and proceeds as follows: A word sense is accessed from the dictionary database of a machine translation engine 112 by the MapAlign algorithm (FIGS. 2 and 3). In operation 126, candidate matching word senses from the SELECT database are fetched as described above. Then possible matches from the SELECT database 114 are associated with the target, or input, word sense. It should be appreciated that the candidates fetched represent a restricted range of possible matches generated by a directed method rather than a brute force method.

As illustrated in FIG. 3, the possible matches are found in the Meaning Cues database 134 of the SELECT database 114. In operation 128, term vectors are generated for both the target word sense and the candidate word senses from SELECT. In one embodiment, the term vectors contain synonyms for the corresponding word sense and SELECT candidate. In operation 130, the best SELECT candidate is located. In one embodiment, the semantic distance is calculated between the input word sense and each candidate word sense from SELECT, and the SELECT candidate with the closest semantic distance to the target word sense is identified as the best matching candidate, as already described above. Then, as part of the MapVet algorithm, the options are displayed in order of rank in operation 136. It should be appreciated that the options may be ranked and filtered as described above. In operation 138, the mapping options suggested by the mapping algorithm are validated by a human. Also in operation 138, it should be appreciated that a user will look at the displayed options from operation 136 and make a judgment as to whether these options should be recorded in SELECT database 114. Once the options have been validated, the mapping is complete, and is recorded in mappings database 132 of SELECT database 114.

The SELECT database of Meaning Cues and the algorithms used to construct it and align it with third-party lexical resources have been described in detail. However, it should be appreciated that these details may vary depending upon the specific technology of machine translation engine(s) 112 of FIG. 2. For example, if a statistical machine translation engine is used, synonym sets may be obtained for each word sense directly from translation phrase tables. In this case, usable Meaning Cues containing synonyms can be generated without recourse to SELECT, MapAlign, and MapVet. However, these system elements can then optionally be used to align the initial synonym-based Meaning Cues with further cues from SELECT, such as definitions, examples, and pictures. The special case of statistical machine translation will be further discussed below. The techniques for server-based interactive correction of dictation, or very large vocabulary speech recognition, are described below.

Server-Based Interactive Correction of Dictation.

The server-based interactive dictation discussed herein is based on established technologies for distributed computing such as CORBA, Sun's Java RMI (Remote Method Invocation), and Microsoft's .NET Remoting services. As used herein, the term "remote invocation" refers to all such technologies.

Such models provide a framework for building applications which enable a client application to call methods and functions on server-based objects at runtime over TCP/IP or HTTP communication channels using syntax that, from the client code perspective, treats the remote object as if it is local. The notion of a proxy object is central to such distributed systems. A proxy object on the client stands in for the real object on the server, and underlying software manages the communication between proxy object and the server transparently.

One skilled in the art will appreciate the underlying mechanisms that enable such distributed systems to function, as these mechanisms are well known. The server-based dictation system discussed here allocates and manages third-party dictation engines on behalf of each user. This management includes an instance of the dictation engine itself for each user, as well as the associated speech profile for that user. Thus, all users effectively have access to their own personalized dictation systems, which will function properly and with low-latency on any distributed network. It is crucial that the dictation engine must natively support real-time correction (as does PHILIPS), so that this capability can be transparently passed through to the client. Remote invocation also supports load-balancing on multiple servers in such a way that the system can be scaled for use for thousands of simultaneous users. The fact that remote invocation supports multiple protocols (TCP/IP and HTTP) also provides for the issues that may arise in secure networks where firewalls are present.

Having described in detail techniques for interactive correction of both word sense errors in translation and speech recognition errors (even when the recognizer operates on a server), the cross-lingual communication system enabled by these interactive techniques is now described.

Cross-Lingual Communication System.

Figure 4A:
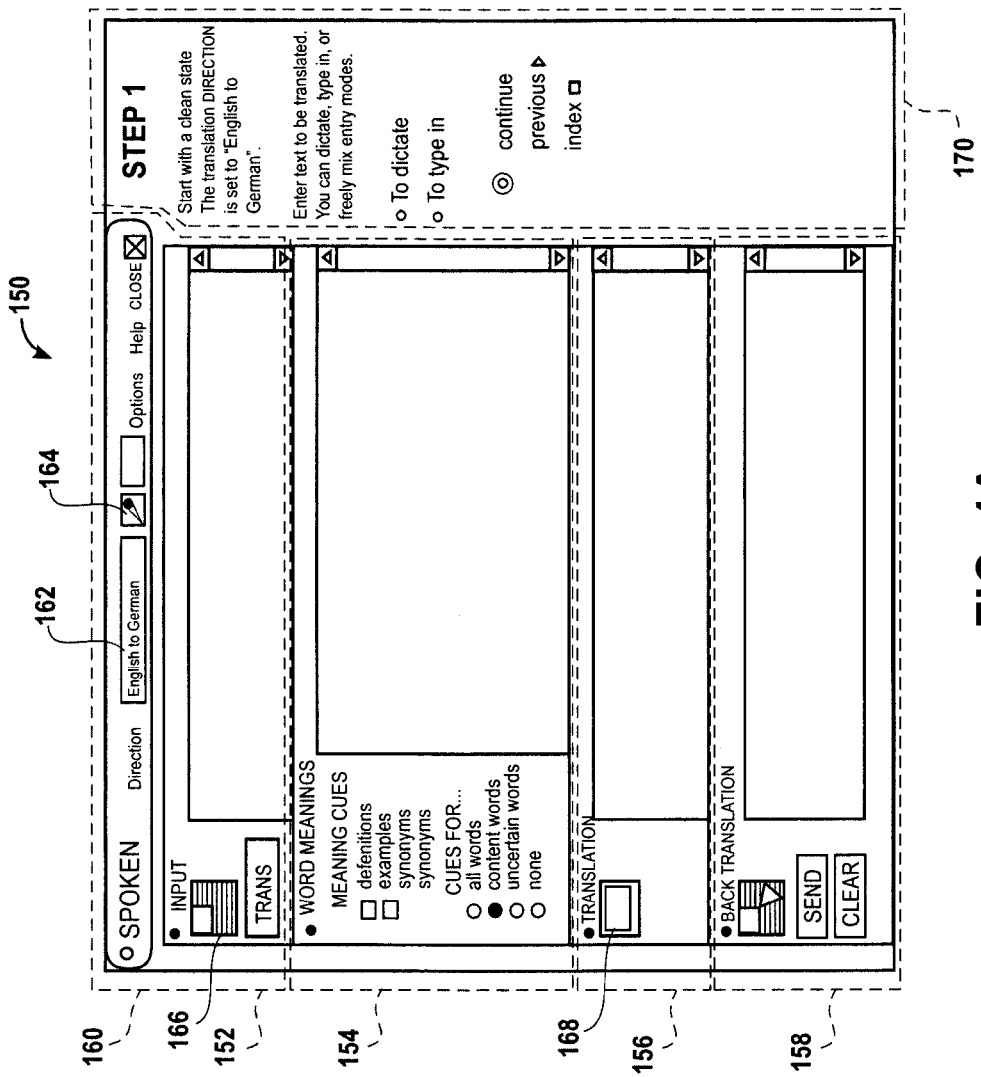
FIGS. 4A through 4G illustrate exemplary screen shots of the multi-modal user interface for an interactive translation process, in accordance with one embodiment of the invention.

FIGS. 4A through 4G illustrate exemplary screen shots of the multi-modal user interface from an interactive translation process in accordance with one embodiment of the invention. FIG. 4A illustrates graphical user interface (GUI) 150 configured to initiate a translation session. The translation direction is defined in box 162 of region 160 of the GUI. Additional language choices may be selected through a drop-down menu associated with box 162. The toolbar of region 160 includes other general functionality, such as enabling and disabling recognition of voice commands through button 164. Region 152 represents a region in which text to be translated should be entered. The text is set to expect input in English, as indicated by flag symbol 166. It should be appreciated that the input text may be typed in, dictated, or entered through some combination of typing and dictation or other means. Region 154 represents a Word Meanings region where the senses and Meaning Cues for each term to be translated may be displayed. As shown, the word senses may be displayed as the desired type of Meaning Cue: definitions, examples, synonyms, or associated words. In region 156, a window is provided for the display of the translation of the input utterance from region 152. Here, the translation language is German, as indicated by flag symbol 168. Region 158 provides a back-translation window. The back-translation is a translation of the translation of region 156 back into the input language. It should be appreciated that, in the cross-lingual communication system of this invention, back-translation or paraphrase is specially controlled: since the translation engine knows the word sense of each expression in the translation, it is in a position to assure that the same word sense is preserved during back translation or paraphrase. Thus the random word ambiguity errors characteristic of uncontrolled back-translation or paraphrase will not occur, and the usefulness of back-translation or paraphrase for monitoring translation quality is considerably enhanced. Region 170 provides commentary in an animated demonstration of the invention. It should be appreciated that region 170 is optional.

Figure 4B:
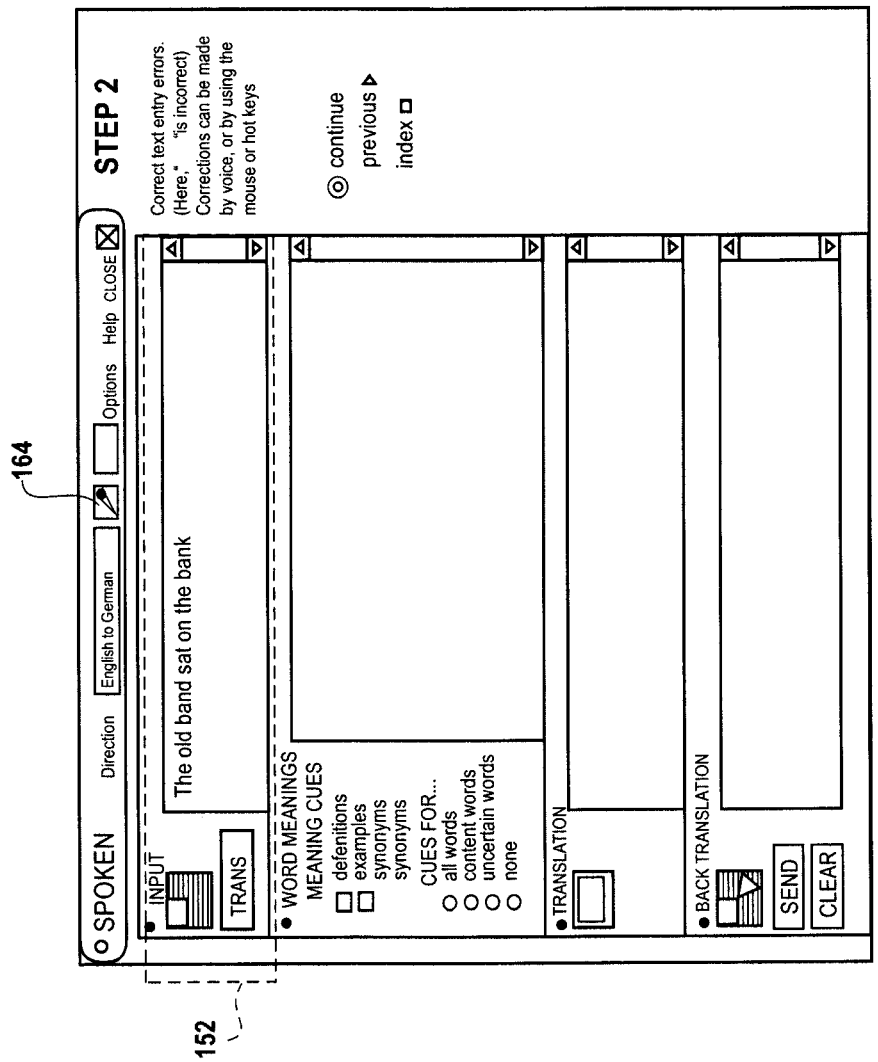
Figure 4C:
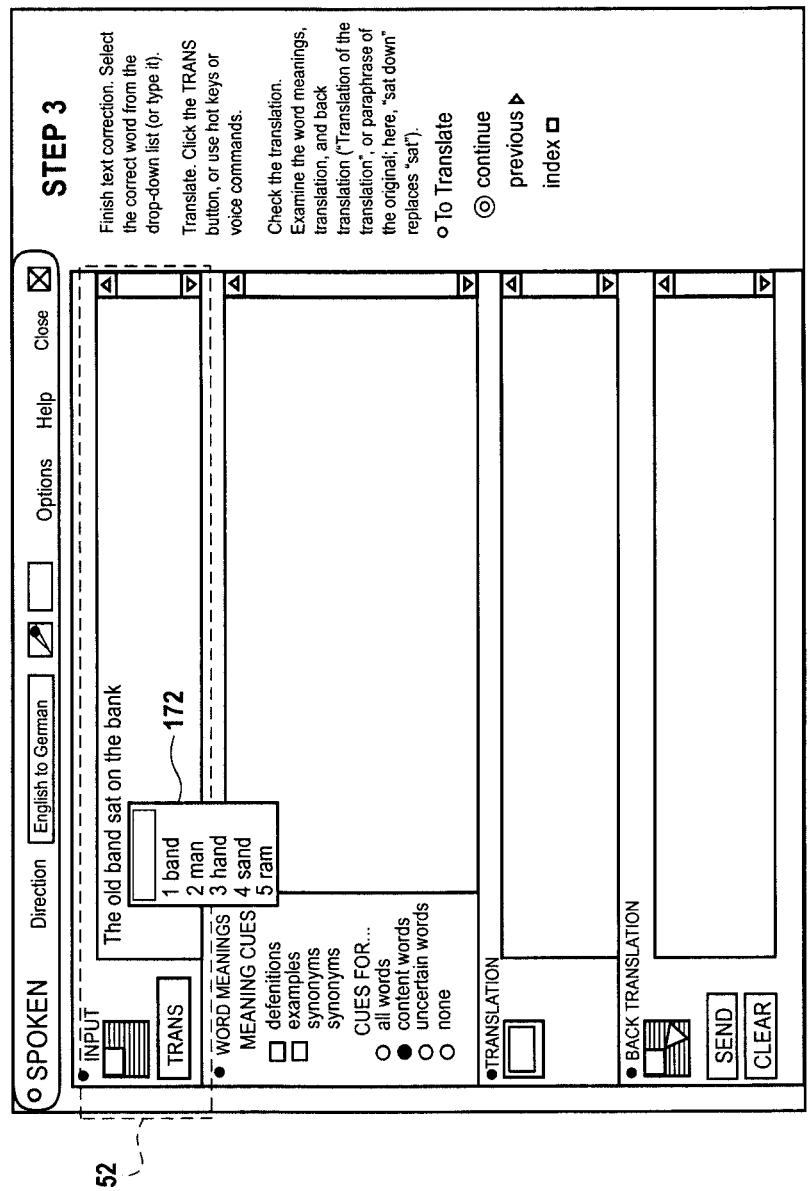

FIG. 4B is a screen shot of the user interface in which terms have been input for translation. As mentioned, the user may type or dictate an utterance, or enter text by some other means. In the case of voice recognition being used for dictation, the client component captures the voice stream and transmits the voice stream to a server for speech recognition (FIG. 2), which in turn communicates a textual representation to the interaction manager. The text is then communicated back to the client for display on the multi-modal user interface. The user can click on button 164 to activate/deactivate the recognition of voice commands such as "Scratch That" to delete the last group of dictated words. Alternatively, the user may type text directly into the Input window. As shown in FIG. 4B, the spoken phrase "The old man sat on the bank" captured by the client has been recognized as "The old band sat on the bank." The user may make any corrections at this point. In this case, the word "band" should be "man." Accordingly, as shown in FIG. 4C "band" is changed to "man" by selection from drop down menu 172. One skilled in the art will appreciate that the correction may be made by voice, by using the mouse, or by using hot keys.

Figure 4D:
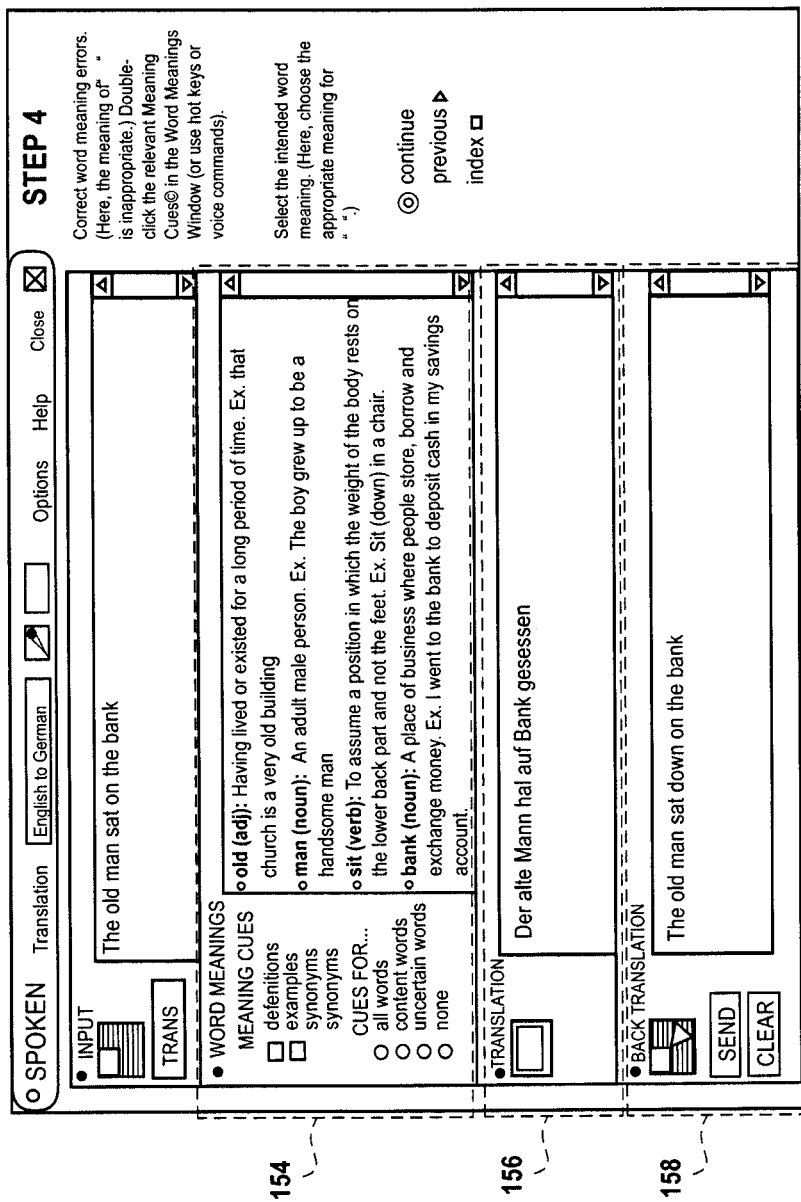
Figure 4E:
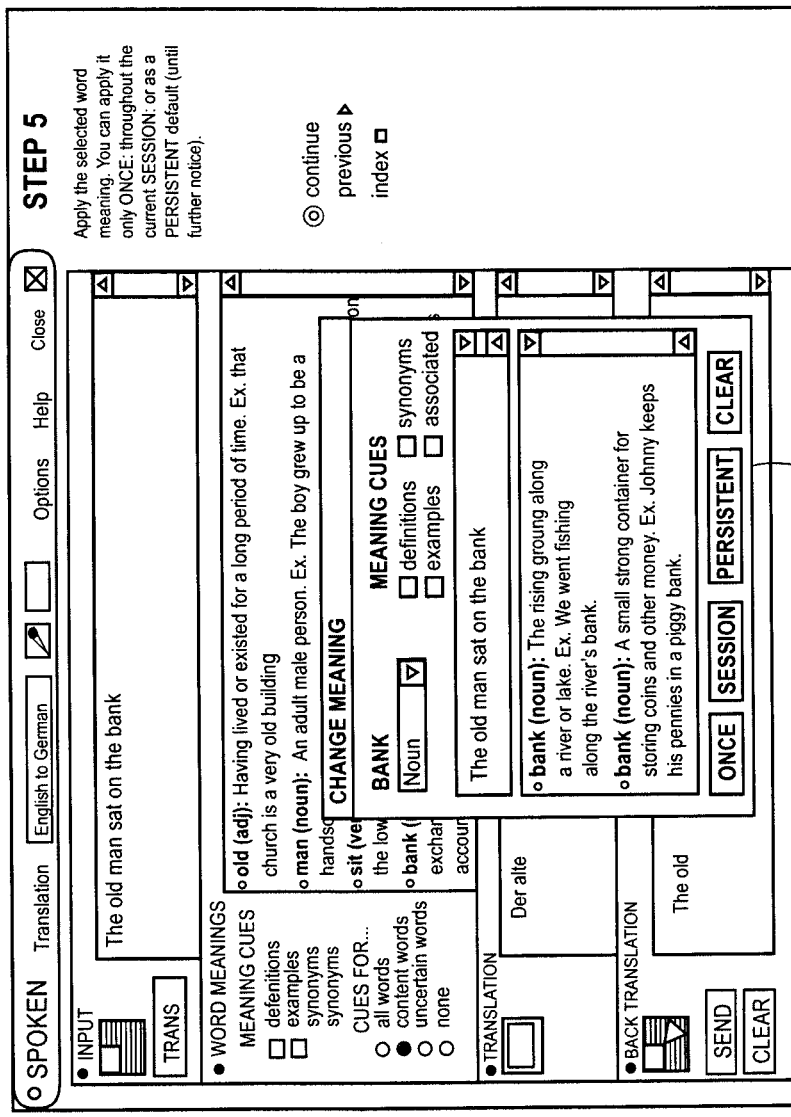

FIG. 4D illustrates the effect of translating the verified phrase of FIG. 4C. Regions 154, 156 and 158 become populated with the respective Meaning Cues, translation, and back-translation. However, in this example, the meaning of "bank" in region 154 is not the sense of the word desired by the user. By clicking on "bank", window 174 appears as illustrated in FIG. 4E. Here, the different senses of the word bank are displayed so that a user can scroll through them. The sense that the user intended is "the rising ground along a river or lake." The user clicks on this sense to incorporate this sense into the translation process. As described herein, the word senses of the SELECT database, constructed as described above, have been mapped into the word senses of the machine translation engine(s) or other suitable lexical resources. Thus, user choices at this step will be faithfully reflected in the translation output. That is, the translated string will be updated as a result of the selection of the different sense of "bank." In one embodiment, the system may record this sense of the word "bank" as a preference for the user and store this preference in the memory database of FIG. 2. More generally, the user can control how the change of sense will be applied: only once; or for the balance of the current session; or persistently from session to session, thus supporting an ongoing process of tuning to the user's preferences as already mentioned. In another embodiment, if users have some knowledge of the target language, they may sometimes want to select among several possible translations for a given meaning. For example, a German-speaking user may want to choose between "maybe" and "perhaps" as the translation of "vielleicht". Either English word would be a valid translation, since both have the same word meaning, but the knowledgeable user may prefer one over the other for stylistic reasons. In one embodiment, similar means are provided for making this choice as for selecting word meanings.

Figure 4F:
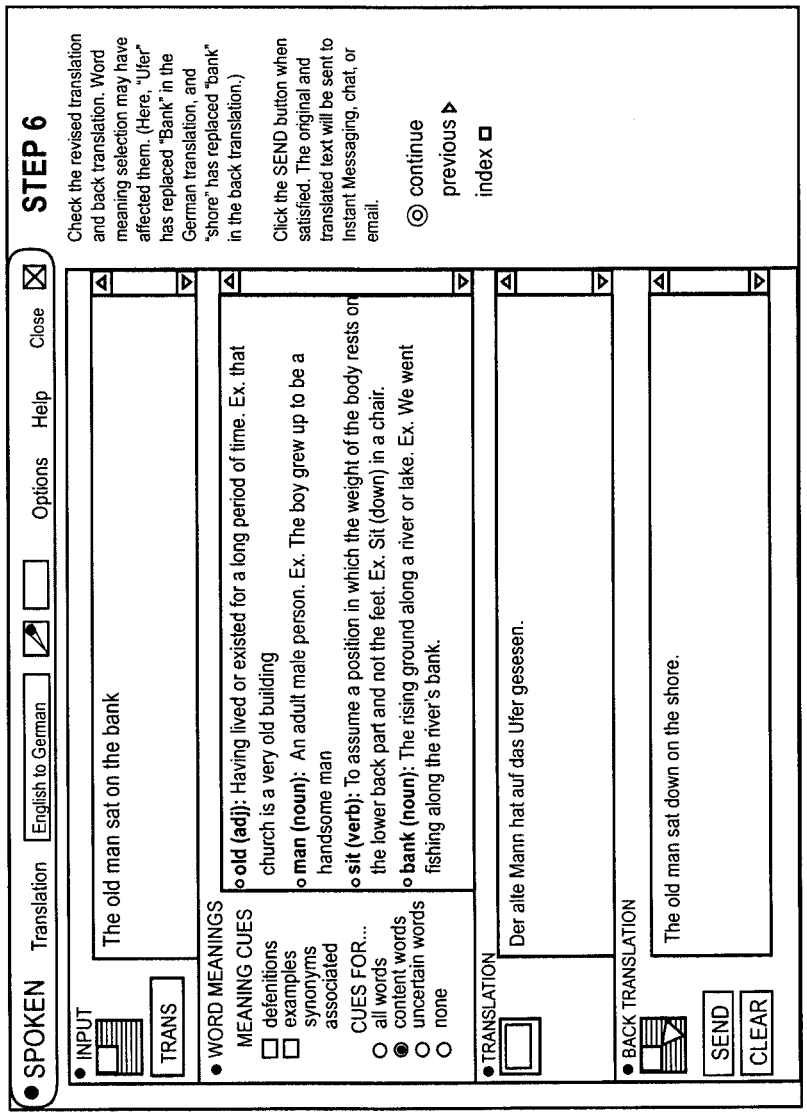
Figure 4G:
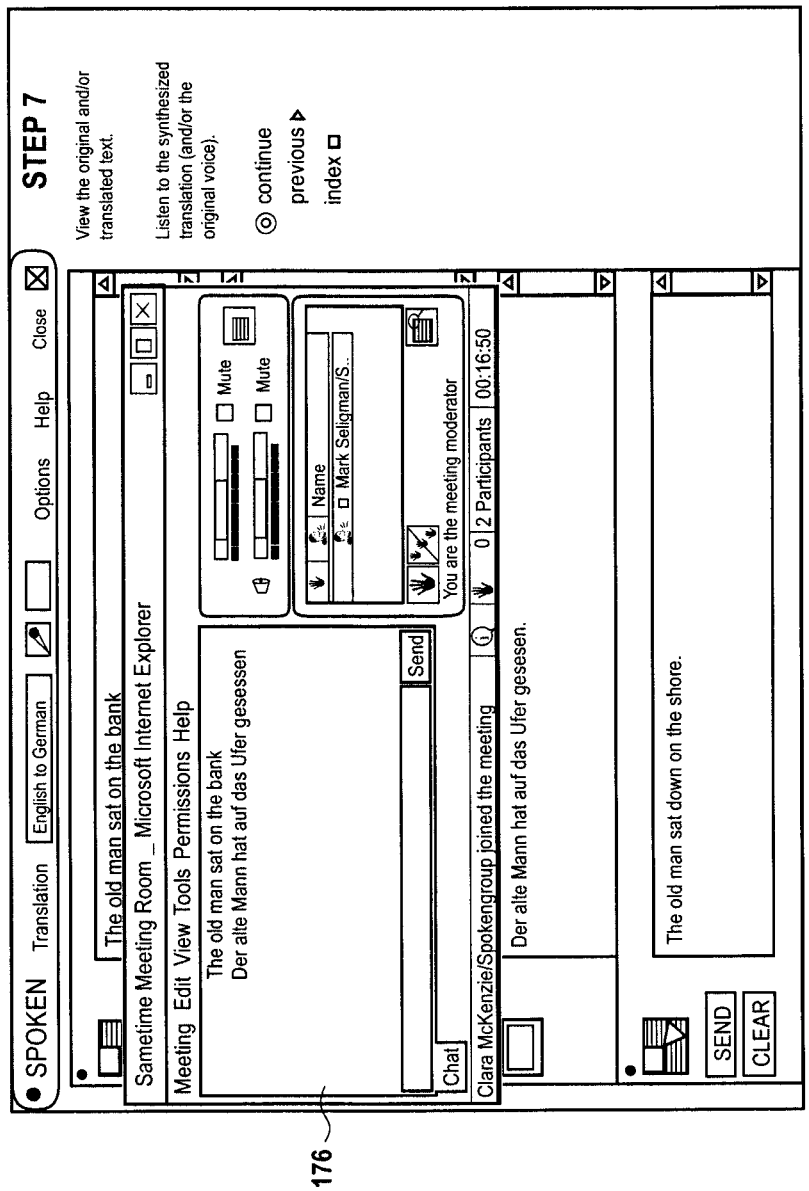

Referring to FIG. 4F, the translation and the back-translation have been updated as a result of the different sense for "bank" being applied. Once the user is satisfied that the translation is acceptable, as indicated by the combination of the back-translation and the Meaning Cues, the Send button is used to accept the translation and trigger the transmission of the translation. The source and/or target text are then sent to the receiving application, e.g., an instant messaging client, or a chat, email, or search application. FIG. 4G illustrates an Instant Messaging window, showing a transcript or record of the conversation. Depending on parameter settings (under Options), the transcript of Instant Messaging Window 176 may be monolingual or multilingual, and may optionally be saved for later review or record keeping. (In handheld devices, the IM window might alternate with the control display, or share screen space using split screen effects.) Optionally, a synthesized pronunciation of the translation and/or input text can be produced at translation transmission time or thereafter, thus completing the speech-to-speech sequence.

The following use scenario repeats for clarity and further explains how the GUI, such as the GUI of FIGS. 4A-4G, may be used. At startup, or after the Clear button has been clicked, all text fields are empty. Once the microphone switch icon has been toggled to the ON position, users can dictate into the text field labeled "Type or dictate." Dictation is verified before continuing. Voice-driven correction within this field will be enabled: users can say "Scratch that!" or "Correct <incorrect words>." As shown in FIGS. 4A-4G this input field is scrollable. When correction of the dictation is complete, users click Translate (or press RETURN). At this point, all of the three Translation Text Fields (Word meanings, Translation, and Back-translation regions of FIGS. 4A-4G) are populated. Users can view the translation (the output language text) and check the back-translation (from the output text back into the input language) in the appropriate text fields. It should be appreciated that the back-translation or paraphrase supplies a rough and imperfect check of translation fidelity. Generally speaking, if the back-translation is acceptable and if individual word meanings have been verified, as discussed above, then the translation is probably understandable. However, if the back-translation is poor, starting over is advisable, preferably with simpler phrasing.

Users may indicate one or more preferred type of Meaning Cue from those available for the current translation direction. The Meaning Cues may be definitions, examples, synonyms, or associated (words). In one embodiment, the default is definitions plus examples, as shown above with reference to FIGS. 4A-4G. The user may also indicate which words in the input should be cued for meaning: all words, content words, uncertain words, or none. Content words, which may be the default value, are nouns, verbs, adjectives, and adverbs. Uncertain words are those words for which the machine translation engine finds multiple relevant senses. Selections are grayed out if the current translation direction does not support them. It should be noted that if a user clicks an element in any display, corresponding elements in all of the displays will be highlighted. To change a word meaning, a user double clicks on a Meaning Cue set. The Change Meaning window then appears in response to this action, as shown in FIG. 4E.

Users can select parts of speech in the Part of Speech dropdown menu within the Change Meaning window. With reference to FIG. 4E, "noun" remains selected, since the machine translation engine analyzed "bank" as a noun. Accordingly, the list of meanings shows only noun senses for this word. However, if the user selects "verb" instead, the set of senses will be repopulated, including e.g. "bank (verb): To follow a curve or incline. Ex. skiers banking around the turn." Users can again indicate one or more preferred Meaning Cues from those available.

Once the desired word meaning has been selected—through a click, by voice command, or through some other suitable selection technique—users can prompt incorporation of this meaning for renewed translation by clicking a button which indicates the way in which the selected word sense should be used: Use once, which is the default and may be activated by the RETURN key; Use for this session; or Use until further notice (which will update the user's personal translation resources at session shutdown time, thus tuning the system's behavior). It should be noted that these actions trigger complete renewed translation and repopulation of all three Translation Text Fields, just as when the Translate button is first pressed.

When users are satisfied with the current translation, they can send it to Instant Messaging, or some other suitable destination, using the Send command. (This button becomes the default immediately after translation, so that sending can be executed simply by pressing the ENTER key.) Appropriate text will be displayed in the instant messaging transcript window. Depending on the settings in the Options dialog, the input text only, the output text only, or both may be shown; and text-to-speech may be generated. The text fields are automatically cleared after a Send command. However, users can manually use the Clear button to restart an utterance from scratch at any point, e.g. when the back-translation is questionable.

The Options menu will bring up a dialogue in which:
  The Transcript Language radio buttons control which text will be sent to Instant Messaging: InputLangTextOnly (usable if translation has been bypassed), OutputLangTextOnly, or Input&OutputLangText (the default).
  The Text-to-speech radio buttons control whether the synthesized voice heard at the current station will be InputLangVoiceOnly, OutputLangVoiceOnly, Input&OutputLangVoices, or NoVoices. (Each partner to the conversation can independently choose which voices to hear.)
  The Record Transcript radio button specifies whether the text transcript of the next segment of the conversation should be saved to a file specified file. Switching on brings up a dialogue prompting for the transcript file location. The button can be switched on and off repeatedly during a session.
  Other settings control e.g. the default input and output languages, the default users, specification of guest users, etc.

The Help menu gives access to online documentation and version and copyright information. It should be appreciated that the details of GUI use are provided for illustrative purposes and not meant to be restrictive.

Figure 5:
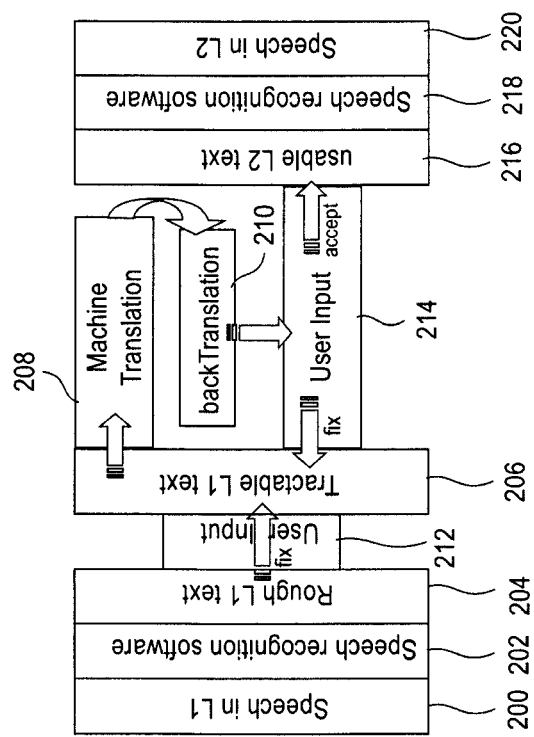
FIG. 5 is a simplified schematic diagram of the control flow for the machine-assisted translation technique, in accordance with one embodiment of the invention.

FIG. 5 is a simplified schematic diagram of the control flow for the machine-assisted speech translation technique in accordance with one embodiment of the invention. The speech-to-speech workflow begins when users dictate input in a first language as captured by module 200. Speech recognition software converts dictation to text as represented by module 202 to provide a rough transcript in module 204. Users correct speech recognition errors by speaking (using voice commands like "Scratch that" or "Correct <incorrect words>") or by typing, as represented in module 212. Users click or use voice commands to execute translation through machine translation module 208. Users then obtain rough feedback concerning translation quality by examining a back-translation (i.e., a translation of the translation back into the original language, or paraphrase of the input) through module 210. To obtain finer control of translation quality, users can resolve word and phrase ambiguities by selecting the desired word meanings (e.g. for "bank" in "the old man sat on the bank") through module 214. Such selections automatically trigger renewed translation and back-translation. When users are satisfied with the translation quality, they click to transmit the translated text (and, if desired, the original text) to instant messaging or some other application. Text-to-speech programs pronounce the translated text of module 216 (and, if desired, the input text as well) through module 218, so that a user may hear that text, as represented by module 220.

Flowchart Diagram for Word-Sense Mapping.

Figure 6:
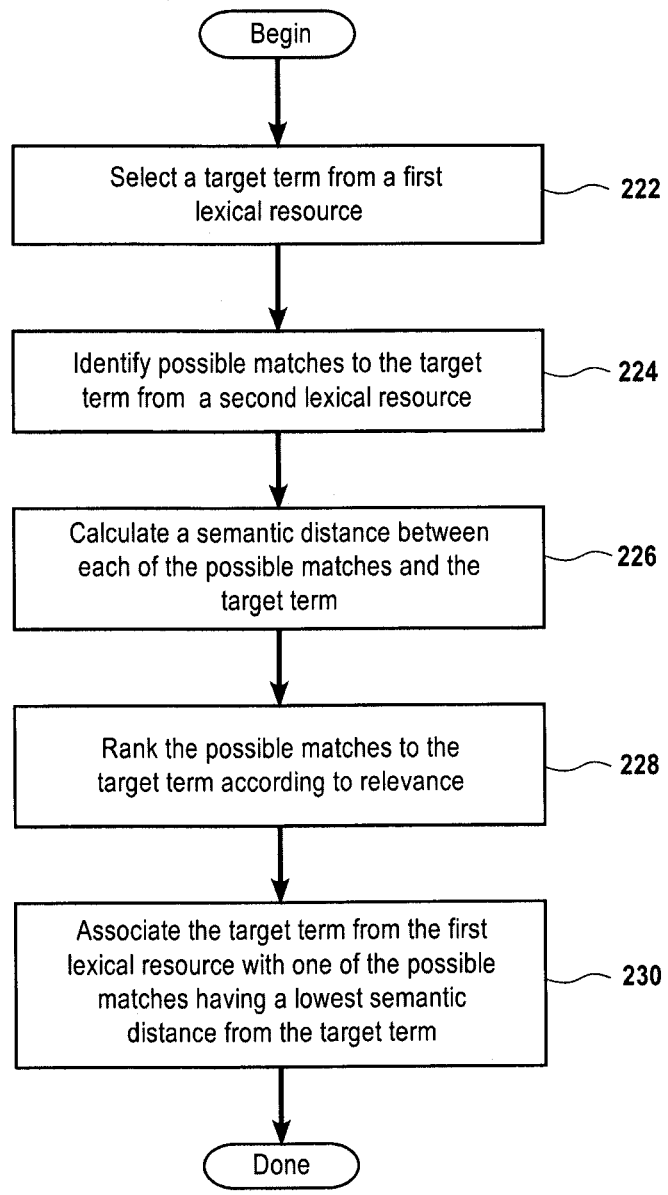
FIG. 6 is a flowchart diagram illustrating the method for mapping word senses across lexical resources, in accordance with one embodiment of the invention.

Returning now to the method for mapping word senses across lexical resources in accordance with one embodiment of the invention, FIG. 6 provides a flowchart diagram. The method begins with operation 222, where a target term (word sense) from a first lexical resource is selected. The lexical resource may be the translation lexicon of a machine translation engine, as mentioned above. The method then advances to operation 224, where possible matches to the target term (word sense) from a second lexical resource are identified. The second lexical resource may be the SELECT database. In one embodiment, the matches are identified by the techniques described above. Thus, a restricted range of possible matches, i.e., the SELECT candidates, are generated here. The method then proceeds to operation 226, where a semantic distance is calculated between each of the possible matching word senses and the target term's word senses. Here a comparison of term vectors provides the semantic distance. The method then advances to operation 228 where the possible matches are ranked according to relevance. Here, a filter may be applied to each of the possible matches, and the possible matches are associated with a weighting factor according to the technique used to identify them, as discussed above. The method then proceeds to operation 230, where the target term word sense from the first lexical resource is associated with the possible match indicating the lowest semantic distance between it and a word sense in the second lexical resource, e.g. a word sense in the SELECT database.

Application of the Invention to Language Instruction.

An exemplary application for the use of the cross-lingual communication system for language instruction is described in detail below. Most simply, in one embodiment of the GUI for disambiguating word senses, the learner gains an awareness of multiple word meanings, thus learning to avoid the most classic translation errors arising from unsuspected ambiguity. However, we can also augment our interface specifically for instructional purposes. For instance, we can align each word in the translation with a source language gloss (in bold), so that students can immediately determine the meanings and functions of all foreign language words. We can also enable immediate access to translation dictionaries by double-clicking any source language or target language word. (Clicking an English word accesses the English-Spanish dictionary, while clicking a Spanish word brings up the Spanish-English dictionary.)

| input: | I don't like that film. | | | |
|---|---|---|---|---|
| translation: | Esa | pelicula | no me gusta. | |
| glosses: | That | movie | - - please | |
| | (dem) | (n) | (neg) (pron, obj, 1 ps) (vt, pres, 3 ps) | |
| backtranslation: | I do not like that movie. | | | |
| Word meanings: | | | | |
| | Film (n): | | | |
| | A movie or motion picture. Ex. We saw an interesting film last night. | | | |
| | A thin layer. Ex. The professor covered the specimen with a thin film of plastic. | | | |

Further, instant text-to-speech for individual words, or for sequences of several words, in both languages may be enabled. For example, CTRL-left-click or some other shortcut or word sequence leads to pronunciation of a selected segment. As an additional augmentation, when the student uses the Change Word Meanings window to select a different meaning of a specified word, we can go beyond the present monolingual display by pointing to the translations corresponding to each word sense. Students can thus see how each word sense would be translated. For example,
  Film (n):
    A movie or motion picture. Ex. We saw an interesting film last night. >pelicula
    A thin layer. Ex. The professor covered the specimen with a thin film of plastic. >capa
Further, if the target language normally uses a non-romanized writing system, a transliteration or syllable rendering can be added to the interface. Here, for example, is how it might look in Japanese.

| input: | I don't like that film. | | | | |
|---|---|---|---|---|---|
| translation: | その | 英画 | は | 嫌い | です。 |
| Transliteration: | sono | eiga | wa | kirai | desu |
| glosses: | That | movie | — | disagreeable | — |
| | (dem) | (n) | (top) | (nomadj) | (cop) |
| backtranslation: | I do not like that movie. | | | | |
| Word meanings: | | | | | |
| | Film (n): | | | | |
| | A movie or motion picture. Ex. We saw an interesting film last night.>英画 (eiga) | | | | |
| | A thin layer. Ex. The professor covered the specimen with a thin film of plastic. > | | | | |
| | 薄い膜 (usui maku) | | | | |

Core Software Components.

The core software components of one embodiment of the invention are discussed below and are designated the Spoken application for convenience only. It should be appreciated that the components will be described for illustrative and explanatory purposes only, and are not intended to be limiting. In one embodiment, there are three principal Spoken services SpokenDictationService (speech recognition module 110 of FIG. 2), SpokenTranslationService (SELECT Database 114 and Machine Translation Engines 112 of FIG. 2), and SpokenTTSService (Text to speech module 118 of FIG. 2). Also included in the system are a client or front end, SpokenClient, and an Interaction Manager. Finally, there are several auxiliary components, including (1) an audio transport facility, which carries sound back and forth between the SpokenClient and SpokenDictationService or SpokenTTSService; (2) a SpokenServer, which mediates between the SpokenClient and all three services; and (3) an instant messaging facility. At runtime, Spoken core software components are instances of Spoken service classes: SpokenDictationService, SpokenTranslationService, and SpokenTTSService. In one embodiment, these classes will be implemented as classes in .NET, CORBA, or similar programming frameworks, with the principal methods described below. Instances of these classes encapsulate native applications or dynamic link libraries (DLLs), e.g., like those of PHILLIPS (for dictation), LINGENIO (for translation), or SCANSOFT (for TTS). In general, the methods of Spoken core software components will not correspond directly to methods or functions in native code. Spoken application programming interfaces (APIs) will instead be abstracted from native ones, so that different translation, dictation, or TTS engines can easily be implemented. Implementation will normally involve the creation of subclasses, e.g. PhilipsDictationService as an extension (subclass) of SpokenDictationService or LINGENIOTranslationService as an extension of SpokenTranslationService.

The SPOKEN service classes are described in more detail below.

SpokenDictationService

The SpokenDictationService class may in one embodiment have the following principal methods:

CreateAcousticModel:
Short Description:
  Creates an Acoustic Model for a specific new user by prompting the user to read a known text, one explicit segment at a time.
Parameters:
  the parameters required by typical functions or methods for creating acoustic models in an SDK like that of Phillips Speech
Does:
  Creates an Acoustic Model for a specific new user by prompting the user to read a known text, one explicit segment at a time. Each segment is either accepted, if it is recognized as close enough to the expected phone sequence, or rejected, with a prompt to read it again. In one embodiment, the process succeeds when all segments have been accepted, or fails when manually aborted.
Returns:
   An instance of the appropriate AcousticModel class, or indication of failure.
Dictate:
Short Description:
   Once triggered by a onMicrophoneActivation event, carries out large-vocabulary, speaker-dependent speech recognition on successive pause-delimited segments of the audio stream.
Parameters:
   TextBuffer (char array): a text buffer (initially empty)
   AudioStream (audio stream): an audio stream
   AcousticModel (object): an instance of the appropriate AcousticModel class, as created by CreateAcousticModel
   Context (object): an instance of the appropriate LanguageModel class
Does:
   Carries out large-vocabulary, speaker-dependent speech recognition on successive pause-delimited segments of the audio stream until manually terminated by an onMicrophoneDeactivation event.
Returns:
   indication of success or failure
Comments:
   If the current pause-delimited segment is recognized as a command, that command is executed on the text buffer (for example, by erasing the text which resulted from the last audio segment in response to the command "Scratch That"). If the current audio segment is not recognized as a command, it is treated as text to be recognized, and the recognition result is inserted into TextBuffer at the insertion point.
   In one embodiment, at least two voice-driven commands will be enabled:
     "Scratch That": erases the text which resulted from the most recently produced pause-delimited audio segment;
     "Correct <incorrect words>":
       saves the current location of the insertion point in the text buffer;
       selects <incorrect words>;
       presents a menu showing a numbered list of the top speech recognition candidates for the selected segment;
       permits selection of a speech recognition candidate, using a spoken number or the keyboard, or alternatively permits type-in of the desired text for that segment;
       replaces <incorrect words> with the correction just specified, and
       returns the cursor to the location saved in the first step
   The process terminates when manually aborted by an onMicrophoneDeactivation event.
   On session termination, AcousticModel is updated with reference to corrections logged during the session.

SpokenTranslationService

In one embodiment, the SpokenTranslationService class may have these principal methods:
TranslateAndCollectWordsenses:
Short Description:
   Translates SourceString from SourceLanguage to TargetLanguage while respecting any WordsenseConstraints and TargetWordConstraints (with optional collection of wordsenses, to be used for interactive disambiguation).
Parameters:
   SourceString (string): a string in the source language, to be translated into the target language
   SourceLanguage (string): a string indicating the source language, e.g. "English" or "Japanese"
   TargetLanguage (string): a string indicating the target language, e.g. "English" or "Japanese"
   WordsenseConstraints (linked list): a list of WordsensePair elements in the format ([word, wordsense], [word, wordsense], . . . ), where word is a string and wordsense is an object, indicating that word should be analyzed as having the sense wordsense. For example, the list (["bank", bank1], . . . ) would indicate that the word "bank" as it appears in the input should be analyzed as having wordsense bank1 (as opposed to competing wordsenses bank2, bank3, etc.).
   TargetWordConstraints (linked list): a list of TranslationPair elements in the format ([sourceword, targetword], [sourceword, targetword], . . . ), indicating that sourceword as it appears in the input should be translated using targetword. For example, the list (["vielleicht", "perhaps"], . . . ) would indicate that the German word "vielleicht" should be translated using the word "perhaps" (as opposed to "maybe", "possibly", etc.).
   CollectWordsenses? (Boolean): If CollectWordsenses? is True, the analyzed wordsenses for all of the words or expressions in SourceString will be collected, along with specified Meaning Cues for each wordsense (definitions, examples, etc.) as indicated by MeaningCueTypes.
   MeaningCueTypes (list): a list of one or more Meaning Cue types, where the possible types are e.g. definition, example, synonym, or associated
Does:
   Translates SourceString from SourceLanguage to TargetLanguage while respecting any WordsenseConstraints and TargetWordConstraints. If CollectWordsenses? is True, additionally collects the analyzed word sense for each word or expression in SourceString, along with specified Meaning Cues as indicated by MeaningCueTypes.
Returns:
   If successful, returns structure containing all input parameters plus output parameter TranslationString in the TargetLanguage and (if requested via CollectWordsenses?) a list of Wordsenses accompanied by Meaning Cues of the specified types. Else returns an indication of failure.
Comments:
   SpokenClient executes TranslateAndCollectWordsenses twice in order to populate three text fields in the GUI—those labeled translation, back-translation, and check word meanings. The client first translates the input string (with collection of wordsenses, in order to enable interactive disambiguation) and then back-translates (without wordsense collection).
   NOTE: During the back-translation or paraphrase, we preserve any
WordsenseConstraints which were specified for the translation direction.
ChangeWordsense:
Short Description:
   Fetches a list of all available or applicable wordsenses for Word, and prompts user to select one of them via the Change Meaning window, using specified MeaningCues (definitions, examples, etc.). Returns the newly selected wordsense.
Parameters:
  Word (string): a word in the input whose wordsense is to be changed
  CurrentWordsense (object): the current wordsense of Word, as assigned by the analysis phase of translation, or as manually set in a previous call to ChangeWordsense
  MeaningCueTypes (list): a list of one or more Meaning Cue types, where the possible types are e.g. definition, example, synonym, or associated
Does:
  Fetches a list of all available wordsenses for Word, and prompts user to select one of them via the Change Meaning window, using specified MeaningCues (definitions, examples, etc.).
Returns:
  If successful, returns structure containing all input parameters plus output parameter NewWordsense. Else returns indication of failure.
Comments:
  If NewWordsense is different from CurrentWordsense, SpokenClient should repopulate the text fields of the GUI by re-executing translation and back-translation, using NewWordsense as a WordsenseConstraint.
ChangeTranslation:
Short Description:
  Fetches a list of all available translations for Word, and prompts user to select one of them via the Change Translation window. Returns the newly selected translation.
Parameters:
  Word (string): a word in the input whose translation is to be changed
  CurrentTranslation (object): the current translation of Word, as assigned by the analysis phase of translation, or as manually set in a previous call to ChangeTranslation
Does:
  Fetches a list of all available translations for Word, and prompts user to select one of them.
Returns:
  If successful, returns structure containing all input parameters plus output parameter NewTranslation. Else returns indication of failure.
Comments:
  If NewTranslation is different from CurrentTranslation, SpokenClient should repopulate the text fields of the GUI by re-executing translation and back-translation, using CurrentTranslation as a TargetWordConstraint.

SpokenTTSService

The SpokenTTSService receives text and parameters indicating aspects of the voice to be produced, and outputs a corresponding audio file or stream.
Text-to-Speech:
Short Description:
  Receives input text and parameters indicating aspects of the voice to be produced, and outputs a corresponding audio file or stream.
Parameters:
  Text (string): a string to be pronounced
  Language (string): a string indicating the language of Text
  Voice (object): the selected voice, e.g. AdultFemale, SeniorMale, etc.
  Speed (integer): the desired speaking speed in words per minute (or other suitable measure)
  Volume (integer): the desired speaking volume or loudness, in a range from 1 (lowest) to 7 (loudest)
Does:
  Receives input text and parameters indicating aspects of the voice to be produced, and outputs a corresponding audio file or stream.
Returns:
  An audio file or stream rendering Text in SourceLanguage, with the desired Voice, Speed, and Volume.

It should be appreciated that the embodiments described above are not limited to symbolic, or rule-based, machine translation, where all aspects of such translation programs, such as grammatical patterns, the possible translations for specific words, etc., are programmed by hand. In other embodiments, the techniques described herein may be applied to statistical machine translation (SMT), in which comparable grammatical patterns and translation correspondences are automatically learned through statistical analysis of large corpora of human translations. Thus, the embodiments described herein may be integrated with statistical machine translation, as well as rule-based machine translation. In some embodiments, implementing the techniques to statistical machine translation enable the addition of interactive capabilities to existing statistical machine translation engines even if programmers are granted no access to the engines' code or input data. That is, the embodiments enable retrofitting of interactive capabilities even for statistical machine translation programs presented as "black boxes," such as the statistical machine translation offered by GOOGLE™. Interactive SMT facilities are useful for real-time verification and correction, and in addition the use of the feedback gained enables machine learning which can progressively improve the relevant SMT system's raw translation quality.

Meaning Cues, as discussed above, are sets of cues which explain the meanings of words or expressions for system users. When input words or expressions have multiple meanings, the cues let users know which meaning the system is presently using for translation. In our present translation systems, cues are presented using synonyms. For instance, a system may indicate that the word "cool" (in an input like "This program is cool") currently (and erroneously) means "chilly, nippy, . . . ." The set of synonyms may be referred to as a synset for short. Users can then indicate preference for other meanings if necessary by specifying other synsets, e.g., "awesome, fantastic, great, . . . " and can then obtain updated translations including the new meanings. In some embodiments, definitions, examples, pictures, and other cues may supplement synsets as Meaning Cues.

A Meaning Cues Set for a given word may be represented as follows:
Word1 (e.g. "cool")
Meaning1 indicated through synset1 (e.g. "chilly, nippy, . . . ")
Meaning2 indicated through synset2 (e.g. "awesome, great, . . . ")

As described above, synsets are obtained and associated with existing machine translation lexicons in rule-based machine translation systems. In statistical machine translation (SMT) systems, similar results are obtained as follows:

Assume a standard SMT setup, consisting of a bi-corpus (a corpus in the input or source language along with its translation into the output or target language) and an SMT system. The SMT system may be word-based, phrase-based, hierarchical, or other.

Running the SMT system over the bi-corpus yields a translation model, including a translation phrase table—a table of associations between language and target language strings. Each association is annotated with a given probability that the current source will lead to a particular target.

| Translation phrase table | | |
|---|---|---|
| Source language expression | Target language expression | Probability |
| cool | frais | .34 |
| cool | chouette | .21 |
| nippy | frais | .88 |
| man | homme | .68 |

The translation phrase table is run through a paraphrase extraction tool, e.g., Parex. The tool works by noting common translations—e.g. by recognizing, in the translation phrase table above, that both "cool" and "nippy" can be translated as French "frais". The tool yields a paraphrase table in the following format:

phrase1|||phrase2|||prob

This expression indicates that, in a given language, phrase1 (the reference phrase) can be paraphrased by phrase2 (a paraphrase) with probability prob. That is, prob is the probability of the paraphrase given the reference. For example:

cool|||nippy|||0.0175624491042

This line indicates that "cool" can be paraphrased as "nippy" with P(nippy|cool) [probability of "nippy" given "cool"]= 0.0175624491042. (The probability number is just an example for illustrative purposes.)

Each line in the paraphrase table gives a pair of synonyms. Several such lines can be brought together to provide synsets (sets of synonyms). For example, the word "cool" may be grouped with "nippy" on one line, and with "chilly" on another, while "chilly" may itself be grouped with "nippy," and these three synonyms can be grouped together, perhaps with other synonyms, to form a synset. A word or phrase with several meanings will participate in several such synsets. Thus "cool" may also be grouped with "fantastic", "awesome", etc. (e.g., because all of these words can translate French "chouette").

The tool can fetch all of the synsets in which "cool" participates. It should be appreciated that in some embodiments it may be necessary to maintain the distinctions among several such synsets involving a given word or expression, e.g., "cool," rather than collapsing them into a single set containing all of these synonyms. The set of synsets for a given word can then function as its Meaning Cue Set for the purposes of interactive SMT-based translation.

However, the SMT-based Meaning Cue Set has a feature not contemplated by rule-based sets. In the SMT version, each synonym in each synset is associated with the probability that the synonym is a good translation. Thus, probabilities for all synsets can be computed, e.g., as the average probability of the contained synonyms; and the synsets in the Meaning Cue Sets can be presented to the user in order of probability, with the synset representing the current meaning at the top, representing the machine translation system's current best guess. (Probabilities can optionally be converted into user-friendly scores, with color coded visual cues, etc.)

Further, the tool can augment the synsets with other sorts of Meaning Cues, such as pictures, definitions, and examples. The programs which can align these alternative cues with the synsets may be the provided through the functionality described above to compile the SELECT database.

Once the user has indicated a preferred meaning—that is, a preferred synset—from an interactive display associated with a current translation segment (phrase or sentence), it will be desirable to generate an updated segment translation which incorporates a translation of the current word or expression which is appropriate to the selected meaning. This controlled generation could be accomplished by modifying the probabilities of the translations associated with the preferred synset members. Alternatively, assuming that the SMT system yields an n-best list (e.g. ten-best list) of candidate translations, we could re-rank the candidates based on the elements of the preferred synset. Hopefully, the preferred translation is already in the list, even if it hasn't been judged the best candidate. This approach has the advantage of avoiding direct interaction with the decoder of the SMT system—the component which actually generates translation strings by assembling, reordering, and modifying partial translations.

The modification of the translation probabilities mentioned above could in principle be carried out in the master copies of the SMT translation phrase tables. However, this design would require rapid updating of the tables and may commit to changes which might prove undesirable. For example, users might commit errors, interfere with each other, etc. For these reasons, in some embodiments, translation phrase table updating is carried out offline at present. Pending changes can be temporarily maintained in separate data structures, which are later integrated into the master structures when appropriate.

In any case, whenever the master translation tables are updated, the updates enabled by interactive translation can progressively improve translation results. These changes can be made via feedback supplied even by monolingual users. Under current SMT systems, feedback for translation improvement can be provided only by users with knowledge of the output as well as the input language. The techniques proposed here, by contrast, can dramatically expand the crowd-sourcing of translation feedback. It should be appreciated that this use of interactive correction (to inform learning of translations) will soon become even more valuable than the original use (assuring reliability of the current translation).

The interactive translation system described herein includes back-translation—re-translation of the output back into the source language. Controls assure that the re-translation reuses the same meanings employed in the forward translation, so that the user will receive a reliable indication of the forward translation's meaning. Comparable results can be achieved for SMT as follows:

The problem of back-translation can be decomposed into two sub-problems:
1) For each word or expression in the input, identify the meaning (synset) used in the forward translation. For example, if the input is "This is a cool program," source language synsets should be identified for "cool," "program," etc.
2) Generate a back-translation, forcing use of the identified source language synsets (meanings).

To identify the synsets (and thus the meanings) used in the forward translation, the current proposed translation for each input expression is observed. For example, if "cool" is presently translated by "frais," then we identify the source language synset composed of synonyms which can also be translated by "frais" and its target language synonyms, e.g. "cool", "nippy", "chilly", . . . . A similar identification must be carried out for each expression in the source language input.

To force a back-translation with the same meanings as used in the forward translation, we employ the techniques outlined above: we may modify the relevant translation tables (whether these are temporary or permanent data structures) to force translations using the source language expressions belonging to the synsets just identified; or we may reorder an n-best list of candidate translations. "Frais" will thus be translated by "cool," "nippy," "chilly," etc.— thus avoiding possible misleading back-translation as e.g. "fresh," "unspoiled," etc.

A "black box" SMT system is one for which no access is allowed to source code or source data, e.g. GOOGLE Translate. The above techniques for interactive translation are adaptable to closed SMT systems. An auxiliary statistical machine translation system, which may be referred to a shadow SMT system, is created for this purpose. The shadow SMT system behaves similarly to the black box system. However, its translation phrase table (and other elements) can be manipulated because they are accessible.

In order to create a shadow SMT system, a shadow translation bi-corpus is created. First, a source language shadow corpus is created. The source language shadow corpus is passed as input to the black box SMT system. The resulting target language output becomes the target half of the shadow bi-corpus, thus completing the shadow translation bi-corpus. A shadow translation model is then created from scratch, based on the now-complete shadow bi-corpus. In some embodiments, the original system's translations may be processed to create the shadow model dynamically, throwing away the translation after use.

In some embodiments, customized auxiliary SMT systems provide customized corpora and translation models for specific domains. These can be merged with those of a shadow SMT system, so that the resulting merged system outperforms the original black box SMT system in the specialized domain while delivering similar performance overall. Of course, if one is working with an SMT system to which access is allowed, i.e., an open-box system, a possible embodiment is to merge the custom system with the open box system directly, without benefit of a shadow system.

In some embodiments a useful tool for instantly turning on and off interactive verification is provided for use in the above described system. While verification and correction is powerful, it does require some time and attention. It is thus useful to offer a quick and intuitive way of bypassing verification when time is of the essence, or when the present conversation is relatively unimportant. For this purpose, a Traffic Light Icon containing the familiar red, yellow, and green signal lights is provided as part of the user interface. The yellow light signals "Proceed with Caution!"—that is, verify the current translation before pronouncing and displaying it to conversation partners. The green light indicates "Full Speed Ahead!" That is, bypass preliminary verification without delay and proceed to pronounce and display the translation (though post-verification may still be enabled, for example by displaying a back translation within a running transcript of the conversation). And finally, the red light signals "Lock Translation!" That is, disable translation entirely, for instance when private conversations are desired, or to guard against careless errors, etc.

This Traffic Light Icon can be used to enable interactive verification and correction during simultaneous automatic machine translation. Programs are now coming into use which can recognize speech and translate the speech quickly enough to simulate human simultaneous interpretation. At the state-of-the-art, however, these remain error-prone. Thus, while it will often be convenient to completely ignore the translation program so as to interpret simultaneously even if poorly, it will sometimes be important to enable users to temporarily stop the show to interrupt simultaneous translation to permit interactive translation for purposes of clarification. The Traffic Light Icon is ideal for this interruption.

In other embodiments, an aid to practicality in speech translation or other real-time translation is provided and is referred to as a Rewind Button. Not infrequently, users issue translations which the user may later wish to correct or refine. This happens most frequently when Green Light Mode is in effect, since then an imperfect or incomplete translation may be issued without any preliminary checking. However, the need may arise even if Yellow Light Mode is in effect, since pre-checking may have been hurried or just mistaken. In such cases, it's helpful to be able to order repetition of an earlier input, so that the translation can be modified or corrected without the need for verbal repetition and repeated speech recognition. The input to be brought back for modification will usually be the most recent one, but our present implementation supplies a list of all previous inputs to enable easy selection.

Translation Shortcuts are fixed phrases which can be used as speed-dial translations. Since Translation Shortcuts have been checked in advance, there's no need to verify them before presentation to conversation partners. Categorization of prepackaged translations is enabled, similar to those in phrase books for travelers. Translation Shortcut Categories can be embedded: for example, within the category of Pharmacy Shortcuts there might be a subcategory for Pharmacy Pickup Window, another for Pharmacy Consultation Window, etc. Quick search is enabled through existing Translation Shortcuts and users can enter a few initial characters or a collection of keywords into the input window in order to retrieve a menu populated by appropriate Shortcuts, from which instant selection can be made. Some unique and original features of Translation Shortcuts:

1) Personal Translation Shortcuts: After verifying the current translation using the interactive tools described herein, users can save the verified result as a custom-made Personal Shortcut, either in an existing category or in a new category created for the purpose.
2) Shared Translation Shortcuts: Online facilities can be created to allow users to share Personal Shortcuts with specified third parties or groups.
3) Automatic switching of Translation Shortcut categories and subcategories to accommodate the current speech participant: In a healthcare setting, when a staff member takes a turn within an Intake Interview Shortcut Category, the Staff sub-category of those Shortcuts should become available; and when a patient takes a turn, the Patient sub-category should become available. Comparable switching can be arranged for other use cases.
4) Specific response sets for individual Shortcuts: For example, a specific question Shortcut may prompt a specific set of answer Shortcuts. The response set may be an existing Shortcut category or sub-category, or it may be an ad-hoc set created only for that prompt.

FIG. 7 illustrates one implementation of an end-user interface for verification of the current translation, focusing upon the claimed facilities for back-translation (branded as Reliable Retranslation™) and lexical disambiguation (branded as Meaning Cues™). The current input, "This is a cool program," has been mistranslated into Spanish as "éste es un programa frío". The back-translation shows that this preliminary translation actually means "This is a cold program"; and the Meaning Cues window indicates that the word "cool" is presently mistranslated as "cold, fresh, chilly, chill, stony, nippy".

Figure 8:
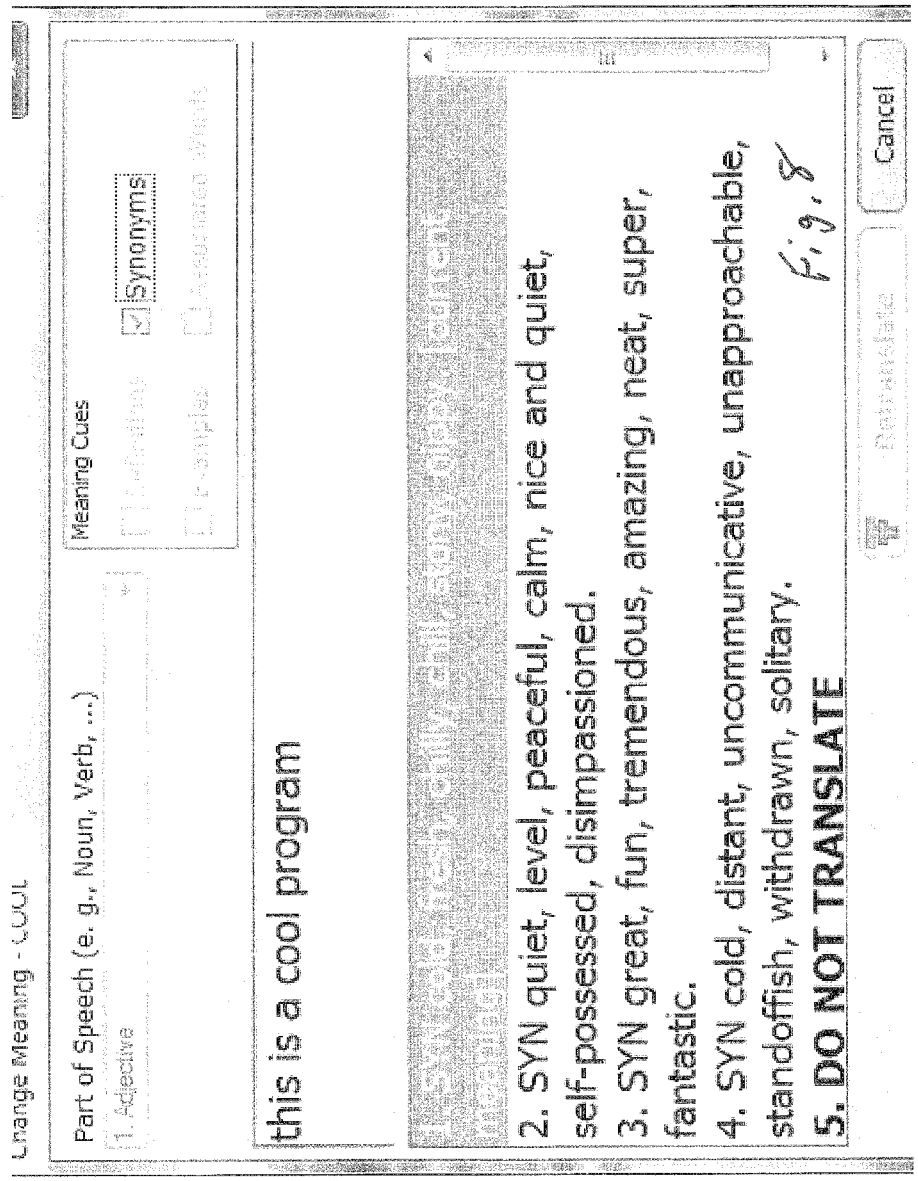
FIG. 8 illustrates one implementation of an end-user interface for correction of the current translation.

FIG. 8 illustrates one implementation of an end-user interface for correction of the current translation. In the current sentence, "This is a cool program," the current meaning (highlighted) is indicated by a Meaning Cue Set, here the synonyms "cold, fresh, chilly, chill, stony, nippy". The user can select a different meaning—in this case, probably number 3, "great, fun, tremendous, amazing, neat, super, fantastic". The system will then produce a revised translation incorporating this preferred meaning.

Figure 9:
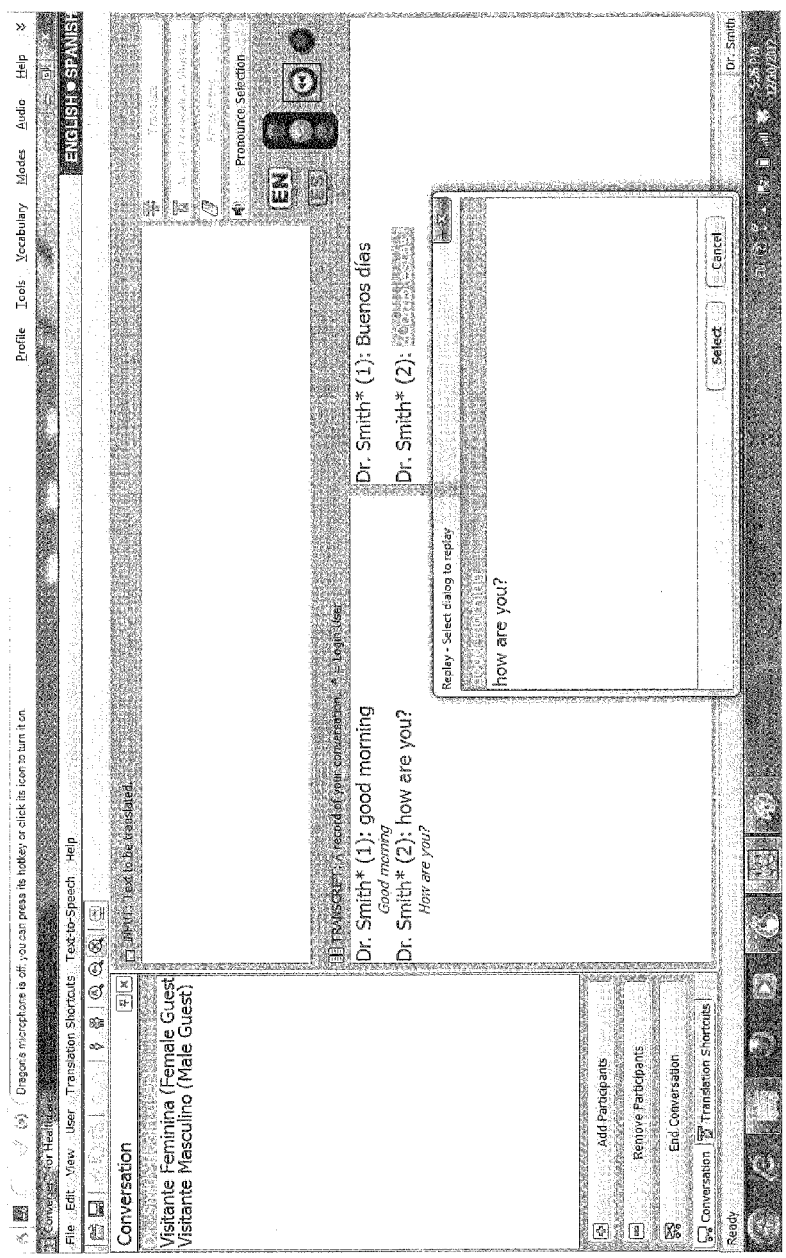
FIG. 9 shows two elements of the speech translation system in accordance with some embodiments

FIG. 9 shows two unique elements of the speech translation system: the Traffic Light Icon, used to indicate whether the user wants to verify, and if necessary correct, the current translation before transmitting it to conversational partners; and the Rewind Button, which presents a list of past utterances so that the user can quickly repeat one of them, normally after making revisions.

Figure 10:
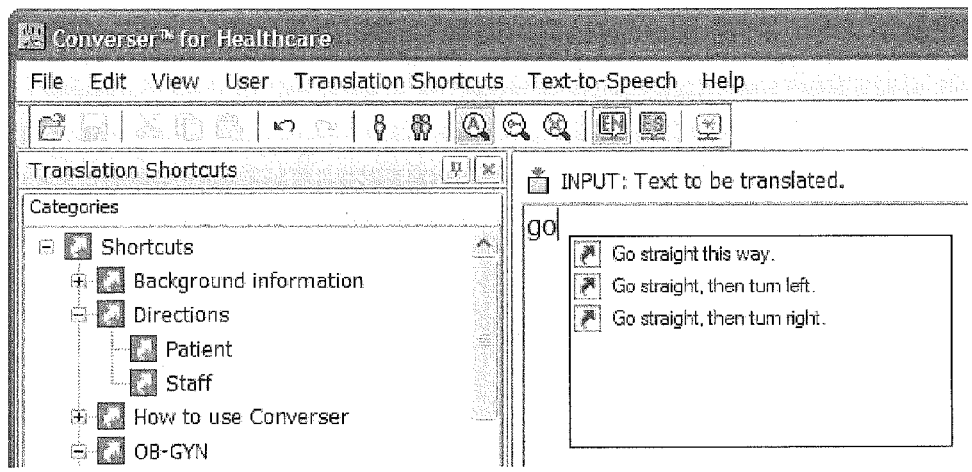
FIG. 10 shows two aspects of the system's Translation Shortcuts™ facility.

FIG. 10 shows two aspects of the system's Translation Shortcuts™ facility. On the left, several Translation Shortcut categories and subcategories are visible. On the right, the Shortcuts Search feature is shown: the user is presently searching by initial characters, as indicated by selection of the small icon resembling a magnifying class examining the letter A. "Go" has been entered into the Input Window, so all of the Shortcuts beginning with these characters are displayed in the dropdown menu. Any of them can be quickly executed and translated. No verification will be necessary, since Translation Shortcuts are pre-verified, either by a professional or by the user via the system's proprietary verification and correction facilities.

In summary, the above-described invention permits for the first time a highly interactive style of speech-to-speech translation. The interactive procedures enable a user to recognize, and if necessary correct, errors in both speech recognition and translation, thus providing much more robust translation output than would otherwise be possible. This enhanced robustness permits practical extension of automatic speech-to-speech translation to wide-ranging language structures and topics, beyond the boundaries of narrow domains, without sacrificing accuracy to the point of impracticality. The interactive techniques for monitoring and correcting word ambiguity errors during automatic translation, search, or other natural language processing tasks depend upon the correlation of Meaning Cues (definitions, synonyms, examples, associated words, pictures, etc.) and their alignment with, or mapping into, the word senses of third party lexical resources, such as those of a machine translation or search lexicon. This correlation and mapping can be carried out through the creation and use of a database of Meaning Cues, herein called SELECT. The intelligent building and application of this database, which can be applied for many purposes, is detailed herein. In particular, some uses of the invention for language instruction are described. Also crucial to the operation of a practical speech-to-speech translation system is interactive, immediate correction of dictation (very large vocabulary speech recognition). Innovative techniques described here permit interactive correction even when a recognition engine is running on a remote server.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer-readable code on a computer-readable medium. The computer-readable medium is any data storage device that can store data, which can be thereafter read by a computer system. Examples of the computer-readable medium include hard drives, network attached storage (NAS), read-only memory, random-access memory, CD-ROMs, CD-Rs, CD-RWs, magnetic tapes, and other optical and non-optical data storage devices. The computer-readable medium can also be distributed over a network coupled computer system so that the computer-readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A system providing cross-linguistic communication and providing feedback for machine learning, comprising:
   a client component capturing speech and tactile inputs, the client component providing a user interface configured to display and correct inputs and meanings for the inputs, a translation of an input term into a different language than an input language, a retranslation from the target language back into the source language, and interface elements indicating one of whether translations should be verified before transmission, whether a previous translation should be revised, or whether pre-translated phrases are available for execution; and
   a server component providing the meanings, the translation and the retranslation to the client component based upon the input term, the server component including,
   an interaction manager stored within memory of the server component, the interaction manger configured to request the translation of the inputs and access a database of Meaning Cues corresponding to the inputs, the corresponding Meaning Cues representing a sense of the input term, the sense including a synonym for each different sense of the input term, wherein each different sense includes a different meaning for the term.

2. The system of claim 1 wherein the Meaning Cues are derived through one of rule-based techniques, statistically based techniques, or some combination of rule based and statistically based techniques.

3. The system of claim 2, wherein Meaning Cues include synonym sets derived from the translation phrase tables of a given statistical machine translation system.

4. The system of claim 3, wherein the synonym sets are derived from the translation phrase tables of a secondary machine translation system which serves as a proxy for the primary translation system.

5. The system of claim 1 further comprising:
   a memory database storing user profiles defining word sense preferences for each user profile.

6. The system of claim 1, wherein the server component includes a speech recognition module in communication with the interaction manager, the speech recognition module permitting use of voice commands captured through the client component.

7. The system of claim 1, wherein the server component includes a text-to-speech module providing an audio signal to the client component for pronunciation of the input term in the different language and the input language.

* * * * *